US012803712B2

(12) United States Patent
Wu

(10) Patent No.: US 12,803,712 B2
(45) Date of Patent: Nov. 17, 2026

(54) METHOD FOR HARQ-ACK INFORMATION TRANSMISSION AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMMUNICATIONS CORP., LTD., Dongguan (CN)

( * ) Notice: Subject to any disclaimer, the term of this patent is extended or adjusted under 35 U.S.C. 154(b) by 400 days.

(21) Appl. No.: 18/422,600

(22) Filed: Jan. 25, 2024

(65) Prior Publication Data

US 2024/0163020 A1 May 16, 2024

Related U.S. Application Data

(63) Continuation of application No. PCT/CN2021/118883, filed on Sep. 16, 2021.

(51) Int. Cl.
*H04L 1/1812* (2023.01)
*H04W 72/11* (2023.01)
*H04W 72/1268* (2023.01)
*H04W 72/232* (2023.01)

(52) U.S. Cl.
CPC ........... *H04L 1/1812* (2013.01); *H04W 72/11* (2023.01); *H04W 72/1268* (2013.01); *H04W 72/232* (2023.01)

(58) Field of Classification Search
CPC ... H04L 1/1812; H04L 1/1854; H04L 1/1896; H04W 72/11; H04W 72/1268; H04W 72/232
See application file for complete search history.

(56) References Cited

U.S. PATENT DOCUMENTS

| | | | | |
|---|---|---|---|---|
| 2010/0281322 | A1 | 11/2010 | Park et al. | |
| 2019/0222394 | A1* | 7/2019 | Medles | H04L 5/0055 |
| 2019/0379489 | A1 | 12/2019 | Hwang et al. | |
| 2020/0322120 | A1* | 10/2020 | Yang | H04L 5/0007 |
| 2020/0374046 | A1* | 11/2020 | Li | H04L 1/1819 |
| 2021/0219241 | A1* | 7/2021 | Wang | H04L 1/1887 |
| 2021/0337529 | A1* | 10/2021 | Ji | H04W 72/20 |
| 2022/0030601 | A1* | 1/2022 | Wang | H04W 72/23 |

(Continued)

FOREIGN PATENT DOCUMENTS

| | | |
|---|---|---|
| CN | 113259070 A | 8/2021 |
| CN | 113261387 A | 8/2021 |

OTHER PUBLICATIONS

Ericsson On HARO enhancements for NTN 3GPP TSG-RANWG1 Meeting #103-e R1-2009093 Nov. 1, 2020 (Nov. 1, 2020); full text.

(Continued)

*Primary Examiner* — Brandon J Miller
(74) *Attorney, Agent, or Firm* — Ladas & Parry LLP

(57) ABSTRACT

Provided are a communication method and a storage medium. The communication method includes: determining, by a terminal device, a reception of a first physical channel and/or a second physical channel; and determining, by the terminal device, whether to transmit a hybrid automatic repeat-request acknowledgement (HARQ-ACK) information according to the reception of at least one the first physical channel and/or at least one the second physical channel.

13 Claims, 5 Drawing Sheets

200

(56) References Cited

U.S. PATENT DOCUMENTS

| | | | | |
|---|---|---|---|---|
| 2022/0038243 | A1* | 2/2022 | Shrestha | H04L 1/08 |
| 2022/0322398 | A1* | 10/2022 | Tsai | H04L 1/08 |

OTHER PUBLICATIONS

CAICT Enhancements on HARQ to support NTN 3GPP TSG RANWG1 Meeting #104-eR1-2100306 Jan. 18, 2021 (Jan. 18, 2021) ; full text.
Panasonic HARQ enhancement for NTN 3GPP TSG RAN WG1#106-e R1-2107469 Aug. 6, 2021(Aug. 6, 2021) ; full text.
R1-2108343; Summary # 1 of AI 8.4.3 for HARQ in NTN; Aug. 20, 2021; Section 3.4 (3.4. Enhancement on Type-2 Codebook) is related to the present invention.
3GPP TR 21.905 V16.0.0 (Jun. 2019), Technical Report; 3rd Generation Partnership Project; Technical Specification Group Services and System Aspects; Vocabulary for 3GPP Specifications (Release 16).
International Search Report and Written Opinion, International Application No. PCT/CN2021/118883, mailed May 20, 2022 (18 pages).

* cited by examiner

METHOD FOR HARQ-ACK INFORMATION TRANSMISSION AND STORAGE MEDIUM

CROSS-REFERENCE TO RELATED APPLICATIONS

The present disclosure is a continuation-application of International (PCT) Patent Application No. PCT/CN2021/118883, filed on Sep. 16, 2021, the entire contents of which are hereby incorporated by reference in their entirety.

TECHNICAL FIELD

The present disclosure relates to the field of communication technologies, and in particular to a communication method and a communication apparatus.

BACKGROUND

With the development of communication technology, certain communication systems have introduced a hybrid automatic repeat request (HARQ) process disabling (HARQ disable), or to say, HARQ feedback disable, to improve data transmission efficiency of the communication system. However, it is currently unsure about the way of terminal devices performing communication after the introduction of HARQ feedback disable.

SUMMARY OF THE DISCLOSURE

The present disclosure provides a communication method and a storage medium.

In a first aspect, provided is a communication method, comprising: determining, by a terminal device, a reception of a first physical channel and/or a second physical channel; and determining, by the terminal device, whether to transmit a hybrid automatic repeat-request acknowledgement (HARQ-ACK) information according to the reception of at least one the first physical channel and/or at least one the second physical channel.

In a second aspect, provided is a communication method, comprising: sending, by a network device, at least one first physical channel and/or at least one second physical channel; and determining, by the network device, whether to receive a hybrid automatic repeat-request acknowledgement (HARQ-ACK) information according to a sending of at least one the first physical channel and/or at least one the second physical channel.

In a third aspect, provided is a computer-readable storage medium, storing a program; wherein the program is configured to be executed by a computer to perform the method in the first aspect.

DETAILED DESCRIPTION

Figure 1A:
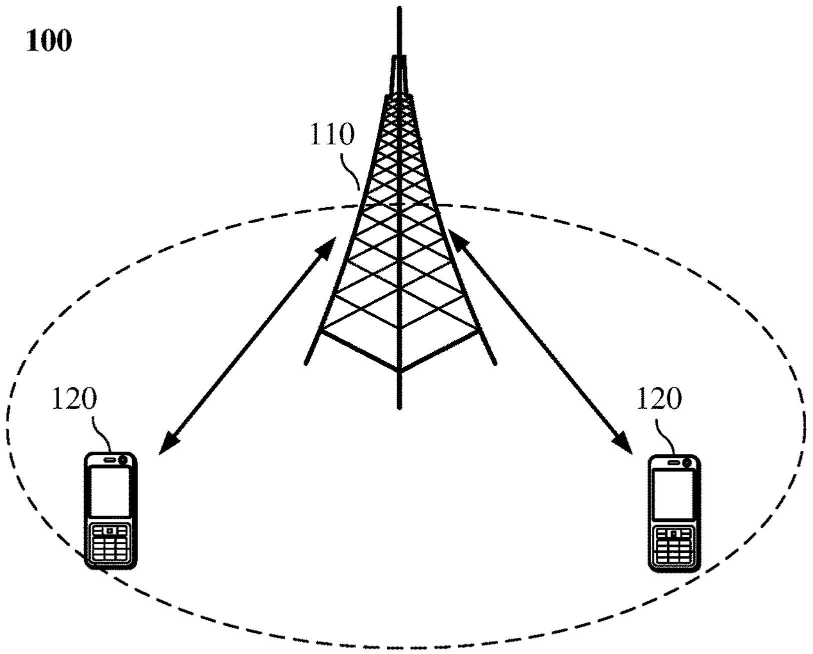
FIG. 1A is a schematic view of a wireless communication system applied by some embodiments of the present disclosure.

The technical solutions in the embodiments of the present disclosure will be described below in conjunction with the accompanying drawings in the embodiments of the present disclosure, and it is clear that the described embodiments are a part of the embodiments of the present disclosure and not all of the embodiments. With respect to the embodiments in the present disclosure, all other embodiments obtained by those skilled in the art without making creative labor fall within the scope of the present disclosure.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long-term evolution (LTE) system, an advanced long-term evolution (LTE-A) system, a new radio (NR) system, an NR evolution system, an LTE-based access to unlicensed spectrum (LTE-U) system, an NR-based access to unlicensed spectrum (NR-U) system, a non-terrestrial networks (NTN) system, a universal mobile telecommunication system (UMTS), a wireless local area network (WLAN), a wireless fidelity (Wi-Fi), a fifth-Generation (5G) system, or other communication systems, such as a future communication system, a sixth-generation mobile communication system, and a satellite communication system.

Typically, a conventional communication system supports a limited number of connections and is easy to implement. However, as communication technologies evolve, mobile communication systems will support not only traditional communication but also, for example, device to device (D2D) communication, machine to machine (M2M) communication, machine type communication (MTC), vehicle to vehicle (V2V) communication, or vehicle to everything (V2X) communication, etc., and embodiments of the present disclosure may also be applied to these communication systems.

The communication system in the embodiments of the present disclosure may be applied in a carrier aggregation (CA) scenario, or a dual connectivity (DC) scenario, or a standalone (SA) deployment scenario.

The communication system in the embodiments of the present disclosure may be applied to an unauthorized spectrum, where the unauthorized spectrum may be considered shared spectrum; or, the communication system in the embodiments of the present disclosure may be applied to an authorized spectrum, where the authorized spectrum may be considered a dedicated spectrum.

The embodiments of the present disclosure may be applied to NTN systems and may be applied to terrestrial communication network (TN) systems. By way of example and not limitation, the NTN systems include an NR-based NTN system and an IoT-based NTN system.

The present disclosure describes various embodiments in conjunction with a network device and a terminal device. The terminal device may be referred to as a user equipment (UE), an access terminal, a subscriber unit, a subscriber station, a mobile station, a mobile platform, a mobile terminal, a remote station, a remote terminal, a mobile device, a user terminal, a terminal, a wireless communication device, a user agent, or a user device, etc.

In the embodiments of the present disclosure, the terminal device may be a station (ST) in WLAN, which may be a cellular phone, a cordless phone, a session initiation protocol (SIP) phone, a wireless local loop (WLL) station, a personal digital assistant (PDA) device, a handheld device or computing device with wireless communication capabilities, or other processing devices connected to wireless modems, an in-vehicle device, a wearable device, a terminal device in next-generation communication systems such as NR network, a terminal device in future-evolved public land mobile networks (PLMN), etc.

In the embodiments of the present disclosure, the terminal device may provide voice and/or data connectivity to a user, and may be configured to connect a person, an object, and a machine, such as a handheld device with wireless connectivity, a vehicle-mounted device, and the like. The terminal device in the embodiments of the present disclosure may be a cellular phone (mobile phone), a tablet computer (Pad), a laptop computer, a PDA, a mobile internet device (MID), a wearable device, a virtual reality (VR) device, an augmented reality (AR) device, wireless terminals in industrial control, wireless terminals in unmanned driving, wireless terminals in remote medical surgery, wireless terminals in smart grid, wireless terminals in transportation safety, wireless terminals in smart city, wireless terminals in smart home, etc. In some embodiments, the UE may act as a base station. For example, the UE may act as a scheduling entity that provides sidelink link signals between UEs in V2X or D2D, etc. For example, cellular phones and automobiles communicate with each other using sidelink signals. Cellular phones and smart home devices communicate with each other without relaying communication signals through a base station.

In the embodiments of the present disclosure, the terminal device may be deployed on land, including indoors or outdoors, handheld, wearable, or vehicle-mounted; on water (e.g., on ships, etc.); and in the air (e.g., on airplanes, balloons, and satellites, etc.).

In the embodiments of the present disclosure, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in unmanned driving, a wireless terminal device in remote medical care, a wireless terminal device in smart grid, a wireless terminal device in transportation safety, a wireless terminal device in a smart city, or a wireless terminal device in a smart home. The terminal device involved in the embodiments of the present disclosure may be referred to as a terminal, user equipment (UE), access terminal device, vehicle-mounted terminal, industrial control terminal, UE unit, UE station, mobile station, mobile platform, remote station, remote terminal device, mobile device, UE terminal device, wireless communication device, UE agent, or UE apparatus, etc. The terminal device may be fixed or mobile.

As an example and not as a limitation, in the embodiments of the present disclosure, the terminal device may be a wearable device. The wearable device may be referred to as a wearable smart device, which is a general term for applying wearable technology to intelligently design and develop wearable devices for daily wear, such as glasses, gloves, watches, clothing, and shoes. The wearable device is a portable device that can be worn directly on the body or integrated into the user's clothing or accessories. The wearable device is a hardware device to realize powerful functions through software support as well as data interaction and cloud interaction. Broadly speaking, the wearable smart devices include full-featured, large-sized devices that do not rely on a smartphone to achieve complete or partial functionality, such as a smartwatch or smart glasses, etc., as well as devices that focus on a certain type of application functionality and need to be used in conjunction with other devices such as a smartphone, e.g., various types of smart bracelets and smart jewelry that perform physical signs monitoring.

The network device in the embodiments of the present disclosure may be a device for communicating with a terminal device, which may also be referred to as an access network device or a wireless access network device, e.g., the network device may be a base station. The network device in the embodiments of the present disclosure may refer to a radio access network (RAN) node (or device) that accesses the terminal device to a wireless network. The base station may broadly cover various names in the following, or be substituted with the following names, such as: NodeB, evolved NodeB (eNB), next generation NodeB (gNB), relay station, access point, transmitting and receiving point (TRP), transmitting point (TP), primary MeNB, secondary SeNB, multi-standard radio (MSR) node, home base station, network controller, access node, wireless node, access point (AP), transmission node, transmitting and receiving node, base band unit (BBU), remote radio unit (RRU), active antenna unit (AAU), remote radio head (RRH), central unit (CU), distributed unit (DU), localization unit (LU), etc. The base station may be a macro base station, a micro base station, a relay node, a giver node, or the like, or a combination thereof. The base station may refer to a communication module, modem, or chip for being disposed within the foregoing device or apparatus. The base station may be a mobile switching center as well as a device that assumes a base station function in device-to-device (D2D), vehicle-to-everything (V2X), machine-to-machine (M2M) communications, a network-side device in a 6G network, a device that assumes a base station function in a future communication system, etc. The base station may support networks with the same or different access technologies. The embodiments of the present disclosure do not limit the specific technology and the specific device form used for the network device.

The base station may be fixed or mobile. For example, a helicopter or drone may be configured to act as a mobile base station, and one or more cells may be moved according to the location of the mobile base station. In other examples, the helicopter or drone may be configured to act as a device to communicate with another base station.

In some deployments, the network device in the embodiments of the present disclosure may refer to a CU or a DU; alternatively, the network device includes a CU and a DU. gNB may further include an AAU.

The network device and terminal device may be deployed on land, including indoor or outdoor, handheld or vehicle-mounted; on water; and on airborne airplanes, balloons, and satellites. The scenarios in which the network device and terminal device are deployed are not limited in the embodiments of the present disclosure.

By way of example and not as a limitation, in the embodiments of the present disclosure, the network device may have a mobile characteristic, e.g., the network device may be a mobile device. In some embodiments of the present disclosure, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, etc. In some embodiments of the present disclosure, the network device may be a base station set in a location on land, water, etc.

In the embodiments of the present disclosure, the network device may provide services for a cell, and the terminal device communicates with the network device through transmission resources (e.g., frequency domain resources, or to say, spectrum resources) used by the cell. The cell may correspond to the network device (e.g., the base station), the cell may belong to a macro base station or may belong to a base station corresponding to a small cell. The small cells herein may include: metro cell, micro cell, pico cell, femto cell, etc. These small cells are characterized by a small coverage area and a low transmit power, and are suitable for providing a high-speed data transmission service.

Exemplarily, FIG. 1A shows a schematic view of an architecture of a communication system according to some embodiments of the present disclosure. The communication system 100 may include a network device 110, and the network device 110 may be a device that communicates with a terminal device 120 (or referred to as a communication terminal, terminal). The network device 110 may provide communications coverage for a specific geographic region and may communicate with the terminal device located within the coverage region.

FIG. 1A exemplarily illustrates one network device and two terminal devices. In some embodiments, the communication system 100 may include multiple network devices and may include other numbers of terminal devices within the coverage region of each of the network devices, without limitation in the embodiments of the present disclosure.

Figure 1B:
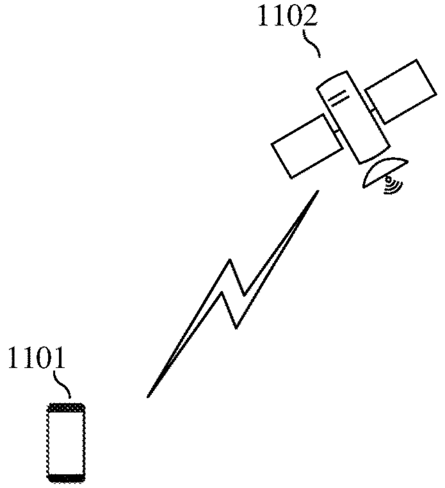
FIG. 1B is another schematic view of a wireless communication system applied by some embodiments of the present disclosure.

Exemplarily, FIG. 1B shows a schematic view of an architecture of another communication system according to some embodiments of the present disclosure. Referring to FIG. 1B, a terminal device 1101 and a satellite 1102 are included, and wireless communication may be conducted between the terminal device 1101 and the satellite 1102. The network formed between the terminal device 1101 and the satellite 1102 may also be referred to as an NTN. In the architecture of the communication system shown in FIG. 1B, the satellite 1102 may have the function of a base station, and there may be direct communication between the terminal device 1101 and the satellite 1102. In the system architecture, the satellite 1102 may be referred to as a network device. In some embodiments of the present disclosure, multiple network devices 1102 may be included in the communication system, and other numbers of terminal devices may be included within the coverage region of each network device 1102, which is not limited by the embodiments of the present disclosure.

Figure 1C:
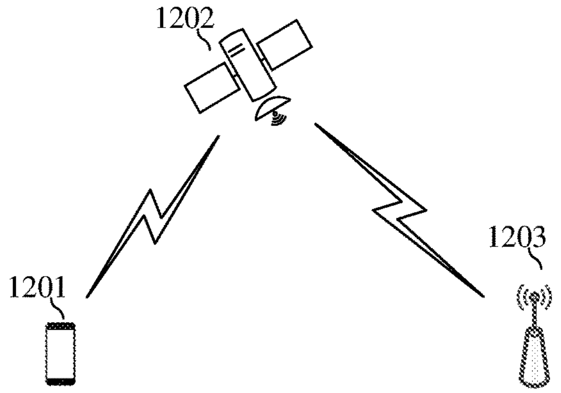
FIG. 1C is further another schematic view of a wireless communication system applied by some embodiments of the present disclosure.

Exemplarily, FIG. 1C shows a schematic view of an architecture of another communication system according to some embodiments of the present disclosure. Referring to FIG. 1C, a terminal device 1201, a satellite 1202, and a base station 1203 are included. Wireless communication may be conducted between the terminal device 1201 and the satellite 1202, and communication may be conducted between the satellite 1202 and the base station 1203. The network formed between the terminal device 1201, the satellite 1202, and the base station 1203 may also be referred to as an NTN. In the architecture of the communication system shown in FIG. 1C, the satellite 1202 may not function as a base station, and the communication between the terminal device 1201 and the base station 1203 is required to be relayed through the satellite 1202. In the system architecture, the base station 1203 may be referred to as a network device. In some embodiments of the present disclosure, multiple network devices 1203 may be included in the communication system, and other numbers of terminal devices may be included in the coverage region of each network device 1203, which is not limited by the embodiments of the present disclosure.

It should be noted that FIGS. 1A-FIG. 1C only illustrate the system to which the present disclosure applies in the form of an example, and of course, the method shown in the embodiments of the present disclosure may be applicable to other systems, such as, a 5G communication system, an LTE communication system, and so on, to which the embodiments of the present disclosure do not make any specific limitation.

In some embodiments of the present disclosure, the wireless communication system shown in FIGS. 1A-FIG. 1C may include a mobility management entity (MME), an access and mobility management function (AMF), and other network entities, without limitation of the present disclosure.

It should be understood that the devices in the network/system in the embodiments of the present disclosure that have communication functions may be referred to as communication apparatuses. Taking the communication system 100 illustrated in FIG. 1A as an example, the communication apparatus may include the network device 110 and the terminal device 120 having communication functions, and the network device 110 and the terminal device 120 may be specific devices as described above, which will not be repeated herein. The communication apparatus may further include other devices in the communication system 100, such as a network controller, a mobile management entity, and other network entities, which are not limited in the embodiments of the present disclosure.

It should be understood that the "instruct" mentioned in the embodiments of the present disclosure may be a direct instruction, an indirect instruction, or an indication of an associated relationship. For example, A instructing B may mean that A directly instructs B, e.g., B may obtain something through A; may mean that A indirectly instructs B, e.g., A instructs C, and B may obtain something through C; or may mean that there is an associative relationship between A and B.

In the description of the embodiments of the present disclosure, the term "corresponding" may indicate a direct or indirect corresponding relationship between the two, an associated relationship between the two, or a relationship between instructing and being instructed, configuring and being configured, etc.

In some embodiments of the present disclosure, the term "configuration" may include configuration through at least one of system messages, radio resource control (RRC) signaling, and media access control control element (MAC CE).

In some embodiments of the present disclosure, "predefined" or "preset" may be realized by storing a corresponding code, form, or other means that can be configured to indicate relevant information in advance in a device (for example, including a terminal device and a network device), and the present disclosure does not limit the specific realization thereof. For example, predefinition may mean being defined in a protocol.

In some embodiments of the present disclosure, the "protocol" may refer to a standard protocol in the field of communication, for example, LTE protocol, NR protocol, and relevant protocols applied in future communication systems, and the present disclosure does not limit in this regard.

In order to facilitate understanding, some related technical knowledge involved in the embodiments of the present disclosure is first introduced. The following related technologies can be arbitrarily combined with the technical solutions of the embodiments of the present disclosure as optional solutions, and they all fall within the scope of the embodiments of the present disclosure. The embodiments of the present disclosure include at least some of the following.

An existing communication system supports a hybrid automatic repeat request (HARQ) mechanism for retransmission. Conventionally, each upstream and downstream carrier can support a maximum of 16 HARQ processes; for a 15 kHz subcarrier interval, with the round trip time (RTT) for signaling being less than 16 ms, the terminal device can always have parallel HARQ processes for data transmission without affecting the maximum throughput of the terminal device.

However, in an NTN system, the communication distance between the terminal device and the satellite (i.e., the network device) is very long, and the RTT for signaling is much greater than 16 ms. For example, in an LEO system, the RTT for signaling can be on the order of tens of milliseconds; and in a GEO system, the RTT for signaling can be on the order of hundreds of milliseconds, and the maximum RTT for signaling can reach about 600 ms. In this case, there may be a situation where all the HARQ processes of the terminal device are occupied (for data transmission), and the terminal device has new services to be transmitted but there is no available HARQ process, which will affect the throughput of data transmission of the terminal device.

Currently, HARQ disable is introduced in the NTN system, i.e., the network device is configured to disable one or some downstream HARQ processes of the terminal device to solve the above problems. For a downlink HARQ process that is configured to be disabled, the network device does not need to receive hybrid automatic repeat-request acknowledgement (HARQ-ACK) information back from a transport block (TB) transmitted by the terminal device in the HARQ process, to reuse the HARQ process for data transmission; alternatively, the terminal device does not need to send back its corresponding HARQ-ACK information for the TB transmitted in the HARQ process, such that the network device can use the HARQ process, that is configured to be disabled, to schedule multiple packets for the terminal device, thereby reducing the impact of the RTT and improving the efficiency of data transmission. In addition, for a downlink HARQ process that is not configured to be disabled, or a downlink HARQ process corresponding to an enabled state, the terminal device may feed its corresponding HARQ-ACK information for the TB transmitted in the HARQ process.

In the communication system, the terminal device may perform HARQ-ACK feedback according to at least one of a semi-static codebook feedback such as Type-1 HARQ-ACK codebook feedback or Type-3 HARQ-ACK codebook feedback, and a dynamic codebook feedback such as Type-2 or eType-2 HARQ-ACK codebook feedback; alternatively, the terminal device may be configured with semi-static HARQ-ACK codebook feedback and/or dynamic HARQ-ACK codebook feedback.

When the terminal device is configured with dynamic HARQ-ACK codebook feedback such as Type-2 HARQ-ACK codebook feedback, the dynamic HARQ-ACK codebook includes HARQ-ACK information corresponding to a downlink physical channel being scheduled within a HARQ-ACK feedback window. The downlink authorization downlink control information (DCI) format received by the scheduled downlink physical channel includes a downlink assignment index (DAI) information field:

Counter DAI (C-DAI) information, which is configured to determine which row of downlink transmission within the HARQ feedback window is the current DCI-scheduled downlink transmission.

In cases of a carrier aggregation scenario, the DCI may further include:

Total DAI (T-DAI) information, which is configured to determine the number of downlink transmissions included in the HARQ feedback window up to the current DCI scheduling.

The C-DAI information and/or the T-DAI information is sorted in a manner that is according to the order of monitoring occasions of the control channel within the HARQ feedback window.

When the terminal device is configured with enhanced dynamic HARQ-ACK codebook feedback such as eType-2 HARQ-ACK codebook feedback, the enhanced dynamic HARQ-ACK codebook includes HARQ-ACK information corresponding to a downlink physical channel of a scheduled packet within a HARQ-ACK feedback window. The DCI format of the scheduled downlink physical channel includes C-DAI information and/or T-DAI information of a group. The group index corresponding to the group may be preset or indicated by the network device through the DCI. The terminal device may be configured with a maximum of two groups, represented by group 0 and group 1, respectively.

When the terminal device is configured with eType-2 HARQ-ACK codebook feedback, two sub-codebooks may be included in the dynamic HARQ-ACK codebook. Among them, a first sub-codebook may include HARQ-ACK feedback for downlink transmissions in a first group (e.g., group 0), and a second sub-codebook may include HARQ-ACK feedback for downlink transmissions in a second group (e.g., group 1).

When the terminal device is configured with code block group (CBG)-based transmission and/or CBG-based codebook feedback, two sub-codebooks may be included in the dynamic HARQ-ACK codebook. Among them, a first sub-codebook may include TB-based HARQ-ACK feedback and a second sub-codebook may include CBG-based HARQ-ACK feedback.

The present disclosure has found, after research and analysis, that after the introduction of the HARQ disable, the following problem may occur: a scenario in which the terminal device receives all downlink transmissions of the HARQ process corresponding to the disabled state within a HARQ feedback window. For this scenario, there may be various situations; for example, a first situation is that the network device does not send the downlink physical channel of the HARQ process corresponding to the disabled state in the HARQ feedback window; a second situation is that the network device sends one or more downlink physical channels of the HARQ process corresponding to the disabled state in the HARQ feedback window but the one or more downlink physical channel of the HARQ process corresponding to the disabled state is not received by the terminal device. In addition, it may occur that the network device first sends one or more downlink physical channels of the HARQ process corresponding to the disabled state in the HARQ feedback window.

For the first situation, the terminal device is required to determine whether to feedback the HARQ-ACK information; and for the second situation, the terminal device and/or the network device is required to determine how the C-DAI information and/or the T-DAI information in the DCI corresponding to the one or more downlink physical channels of the HARQ process corresponding to the disabled state should be set.

Therefore, a communication method is proposed in the embodiments of the present disclosure, which may reduce signaling overhead and thus improve the communication efficiency of the communication system.

It should be noted that the scheme in the embodiments of the present disclosure is applicable to a downlink transmission scenario, i.e., the network device sends a first physical channel and/or a second physical channel, and the terminal device correspondingly receives the first physical channel and/or the second physical channel; in some cases, the scheme in the embodiments of the present disclosure is applicable to a sidelink transmission scenario, i.e., the second terminal device sends a first physical channel and/or a second physical channel, and the first terminal device correspondingly receives the first physical channel and/or the second physical channel, e.g., D2D, M2M, V2V, or V2X scenarios; in other cases, the scheme in the embodiments of the present disclosure is applicable to an uplink transmission scenario, i.e., the terminal device sends a first physical channel and/or a second physical channel, and the network device correspondingly receives the first physical channel and/or the second physical channel.

The embodiments of the present disclosure are exemplified in detail below in connection with FIGS. 2 to 8, taking a downlink transmission scenario as an example. It should be understood that the methods in the embodiments of the present disclosure may also be applicable to a sidelink transmission scenario and/or an upstream transmission scenario, which will not be further described in the present disclosure.

Figure 2:
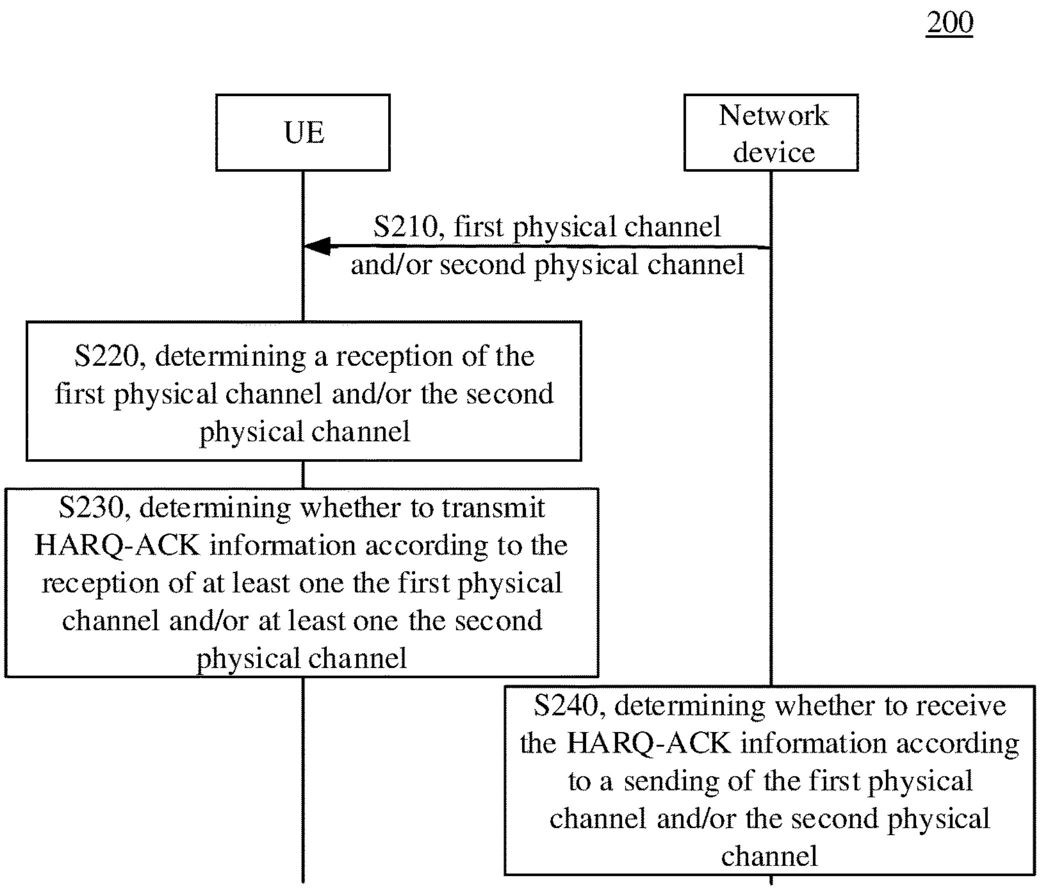
FIG. 2 is a schematic flowchart of a communication method according to some embodiments of the present disclosure.

FIG. 2 is a schematic flowchart of a communication method according to some embodiments of the present disclosure. It should be understood that FIG. 2 illustrates steps or operations of the communication method, but these steps or operations are only exemplary, and the embodiments of the present disclosure may perform other operations or variations of individual operations in FIG. 2, or, not all steps need to be performed, or, the steps may be performed in another order. The method 200 shown in FIG. 2 may include operations S210, S220, S230, and S240 illustrated at blocks herein.

At block S210: sending, by a network device, a first physical channel and/or a second physical channel to a terminal device.

In some embodiments, the terminal device may be configured with dynamic codebook feedback. For example, the terminal device may be configured with Type-2 or eType-2 HARQ-ACK codebook feedback.

The first physical channel may include one or more physical channels.

In some embodiments, for a downlink transmission scenario, the first physical channel may be a downlink physical channel. For example, the downlink physical channel includes a physical downlink shared channel (PDSCH) and/or a semi-persistent scheduling (SPS) PDSCH.

In some embodiments, for an uplink transmission scenario, the first physical channel transmission may be an uplink physical channel. For example, the uplink physical channel includes a physical uplink shared channel (PUSCH) and/or a pre-configured (configured grant) PUSCH.

In some embodiments, for a sidelink transmission scenario, the first physical channel may be a sidelink physical channel. For example, the sidelink physical channel includes a physical sidelink shared channel (PSSCH) and/or an SPS PSSCH.

In some embodiments, the first physical channel may include a physical channel associated with a HARQ process corresponding to a first state.

In some embodiments, the HARQ process corresponding to the first state may include at least one of the following cases: the HARQ process corresponds to a disabled state, the HARQ process is configured with a disabling parameter, and the HARQ process does not correspond to HARQ-ACK feedback.

For example, when a HARQ process 0 of the terminal device is configured with HARQ feedback disable by the network device, the PDSCH received by the terminal device and transmitted through the HARQ process 0 is a first physical information.

The second physical channel may include one or more physical channels.

In some embodiments, for a downlink transmission scenario, the second physical channel may be a downlink physical channel.

In some embodiments, for an uplink transmission scenario, the second physical channel transmission may be an uplink physical channel.

In some embodiments, for a sidelink transmission scenario, the second physical channel may be a sidelink physical channel.

In some embodiments, this second physical channel may include a physical channel associated with a HARQ process corresponding to a second state.

In some embodiments, the second physical channel may include one of the following cases: a physical channel associated with the HARQ process corresponding to the second state, a control channel indicating a semi-persistent scheduling (SPS) physical channel release, a control channel indicating a secondary cell dormancy (SCell dormancy) state, or a control channel associated with HARQ-ACK information.

In some embodiments, for a downlink transmission scenario, the control channel indicating an SPS physical channel release includes a physical downlink control channel (PDCCH) indicating an SPS PDSCH release.

In some embodiments, for a sidelink transmission scenario, the control channel indicating an SPS physical channel release includes a control channel indicating an SPS PSSCH release.

In some embodiments, the HARQ process corresponding to the second state may include at least one of the following cases: the HARQ process corresponds to an enabled state, the HARQ process is not configured with a disabling parameter, and the HARQ process corresponds to HARQ-ACK feedback.

For example, when a HARQ process 1 of the terminal device is not configured with HARQ feedback disable by the network device, the PDSCH received by the terminal device and transmitted through the HARQ process 1 is a second physical information.

As another example, assume that the HARQ process 0 of the terminal device corresponds to the disabled state and the HARQ process 1 corresponds to the enabled state. When the terminal device receives the PDSCH transmitted through the HARQ process 0, the PDSCH transmitted through the HARQ process 1, and the PDCCH indicating the SPS PDSCH release, the first physical channel includes the PDSCH transmitted through HARQ process 0, and the second physical channel includes the PDSCH transmitted through HARQ process 1 and the PDCCH indicating the SPS PDSCH release.

In some embodiments, the sending, by a network device, a first physical channel and/or a second physical channel to a terminal device includes: sending, by the network device, the first physical channel and/or the second physical channel to the terminal device within a first control channel monitoring occasion group.

In some embodiments, the first control channel monitoring occasion group may include a concatenation of control channel monitoring occasions on an activated bandwidth part (BWP) of a service cell with which the terminal device is configured. For example, when the terminal device is configured with two service cells and each service cell is configured with one activated BWP, the first control channel monitoring occasion group may include a concatenation of control channel monitoring occasions on the two activated BWPs. It should be understood that in the embodiments of the present disclosure, the first control channel monitoring occasion group may be considered a HARQ feedback window.

In some embodiments, the control channel monitoring occasion on an activated BWP may be determined according to a HARQ feedback timing (e.g., a PDSCH-to-HARQ feedback timing indicator field) and/or a time unit offset (e.g., a scheduled time slot offset KO).

In some embodiments, the control channel monitoring occasions in the first control channel monitoring occasion group may be sorted according to an ascending order of a start time of each control channel monitoring occasion; the control channel monitoring occasions with the same start time may be sorted according to an ascending order of a service cell index of each control channel monitoring occasion.

In some embodiments, when a control channel monitoring occasion corresponds to multiple physical channel transmissions, the multiple physical channel transmissions corresponding to the control channel monitoring occasion may be sorted according to an ascending order of a start time of each physical channel transmission.

Figure 3:
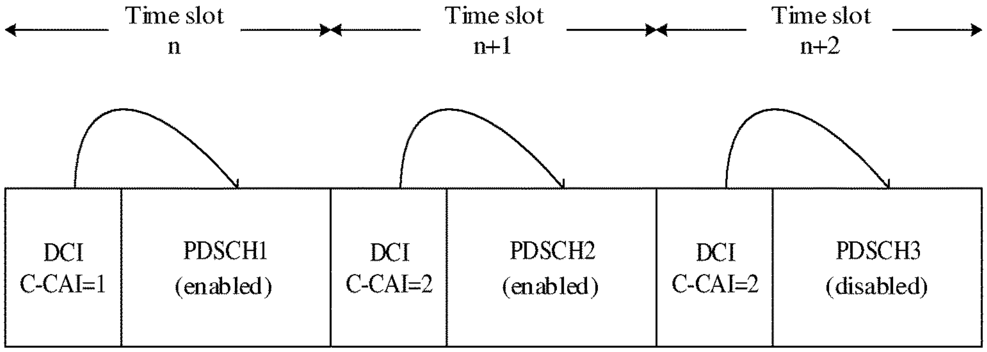
FIG. 3 is a schematic view of a control channel monitoring occasion group according to some embodiments of the present disclosure.

For example, the control channel monitoring occasion group (i.e., a PDCCH monitoring occasion group) shown in FIG. 3 includes 3 PDCCH monitoring occasions, which correspond to a time slot n, a time slot n+1, and a time slot n+2, respectively, with n being an integer. In this example, the 3 control channel monitoring occasions are continuous in the time domain.

Figure 6:
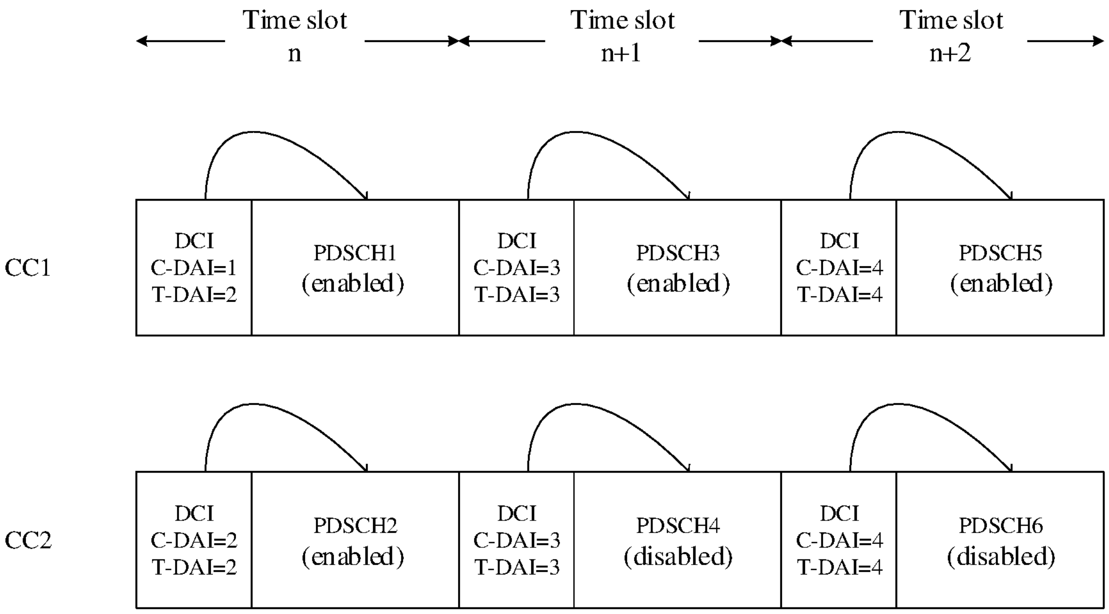
FIG. 6 is a schematic view of a control channel monitoring occasion group according to still other embodiments of the present disclosure.

As another example, FIG. 6 illustrates a control channel monitoring occasion group (i.e., a PDCCH monitoring occasion group) in a multi-carrier scenario; where 3 PDCCH monitoring occasions included on the activated BWP on a component carrier (CC) 1 correspond to a time slot n, a time slot n+1, and a time slot n+2, respectively, and 3 PDCCH monitoring occasions included on the activated BWP on a CC2 correspond to the time slot n, time slot n+1, and time slot n+2, respectively. In the example of FIG. 6, the PDCCH monitoring occasions in the PDCCH monitoring occasion group are sorted in such a way that the time slot n of CC1, the time slot n of CC2, the time slot n+1 of CC1, the time slot n+1 of CC2, the time slot n+2 of CC1, and the time slot n+2 of CC2.

It should be noted that the examples in FIGS. 3 and 6 are only for ease of understanding, and the embodiments of the present disclosure do not limit the control channel monitoring occasions in the control channel monitoring occasion group to be continuous in the time domain. Nor do the embodiments of the present disclosure limit the control channel monitoring occasion groups on different activation BWPs to correspond to the same control channel monitoring time slot.

In some embodiments, the first control channel monitoring occasion group may correspond to a first feedback time unit. The feedback time unit may be a time slot or a sub-time slot or a time slot group. In a case where HARQ-ACK information is required to be sent, the terminal device may transmit the HARQ-ACK information through a feedback resource in the first feedback time unit.

In some embodiments, for a downlink transmission scenario, the feedback resource in the first feedback time unit may be a physical uplink control channel (PUCCH) resource.

Alternatively, in a case where the terminal device is supposed to transmit the HARQ-ACK information on the PUCCH resource in the first feedback time unit, when the PUCCH resource and a PUSCH resource of the terminal device as a resource transmitted on the PUSCH overlap at least partially in the time domain, the terminal device may multiplex the HARQ-ACK information to be transmitted to the PUSCH resource, i.e., transmit the HARQ-ACK information at the PUSCH resource. That is, the feedback resource in the first feedback time unit may be considered to be a PUSCH resource. In some embodiments, the PUSCH may be uplink authorization DCI-scheduled, or, the PUSCH may be a CG-PUSCH.

In some embodiments, for an uplink transmission scenario, the feedback resource in the first feedback time unit may be a PDCCH resource or a PDSCH resource.

In some embodiments, for a sidelink transmission scenario, the feedback resource in the first feedback time unit may be a physical sidelink feedback channel (PSFCH) resource or a PSSCH resource.

At block S220: determining, by the terminal device, a reception of the first physical channel and/or the second physical channel.

In some embodiments, the reception of the first physical channel and/or the second physical channel may include at least one of the following: whether the first physical channel is received, whether only the first physical channel is received, the number of received first physical channels, an order of the received first physical channels in the first control channel monitoring occasion group, whether the second physical channel is received, and whether only the second physical channel is received, the number of received second physical channels, and an order of the received first physical channels in the a second control channel monitoring occasion group.

At block S230: determining, by the terminal device, whether to transmit HARQ-ACK information according to the reception of at least one the first physical channel and/or at least one the second physical channel.

In some embodiments, the determining, by the terminal device, whether to transmit HARQ-ACK information according to the reception of at least one the first physical channel and/or at least one the second physical channel includes: determining, by the terminal device, whether to transmit the HARQ-ACK information according to the reception of at least one of the first physical channel and/or at least one of the second physical channel in the first control channel monitoring occasion group.

In some embodiments, when the terminal device determines to transmit the HARQ-ACK information, the HARQ-ACK information may not correspond to the first physical channel, and/or, the HARQ-ACK information may correspond to the second physical channel. For example, the HARQ-ACK information includes HARQ-ACK information corresponding to the second physical channel and does not include HARQ-ACK information corresponding to the first physical channel. For another example, the HARQ-ACK information may not correspond to the first physical channel or at least one the first physical channel. For further example, the HARQ-ACK information may correspond to the second physical channel or at least one the second physical channel.

In some embodiments, when the terminal device determines to transmit the HARQ-ACK information, the terminal device may transmit the HARQ-ACK information through resources in the first feedback time unit.

In some embodiments, the determining, by the terminal device, whether to transmit HARQ-ACK information according to the reception of at least one the first physical channel and/or at least one the second physical channel includes:

- when the terminal device receives only the first physical channel, the terminal device may not transmit the HARQ-ACK information; or
- when the terminal device does not receive the second physical channel, the terminal device may not transmit the HARQ-ACK information; or
- when the terminal device receives at least one the first physical channel and does not receive the second physical channel, the terminal device may not transmit the HARQ-ACK information; or
- when the terminal device does not receive the first physical channel and does not receive the second physical channel, the terminal device may not transmit the HARQ-ACK information; or
- when the terminal device receives at least one the second physical channel, the terminal device may transmit the HARQ-ACK information.

In some embodiments, the terminal device may determine whether to transmit the HARQ-ACK information according to the reception of at least one the first physical channel and/or at least one the second physical channel, and an assignment index information.

The assignment index information may be in a control information.

It should be understood that the control information may be transmitted through a control channel. For example, DCI may be transmitted through a PDCCH.

In some embodiments, the assignment index information includes a count assignment index information and/or a total assignment index information. As an example, in a single-carrier scenario, the assignment index information includes a count assignment index information; in a multi-carrier aggregation scenario, the assignment index information includes a count assignment index information and/or a total assignment index information.

For a downlink transmission scenario, the control information may be a downlink authorization DCI or an uplink authorization DCI. For a sidelink transmission scenario, the control information may be a sidelink control information (SCI).

It should be understood that in the embodiments of the present disclosure, the downlink authorization DCI includes a DCI scheduling or activating a transmission of a downlink physical channel such as a PDSCH, and the uplink authorization DCI includes a DCI scheduling or activating a transmission of an uplink physical channel such as a PUSCH.

In some embodiments, the downlink authorization DCI includes at least one of DCI format 1_0, DCI format 1_1, and DCI format 12.

In some embodiments, the uplink authorization DCI includes at least one of DCI format 0_0, DCI format 0_1, and DCI format 02.

In some embodiments, for a downlink transmission scenario, the assignment index information may be a DAI information in the control information. In some embodiments, for a sidelink transmission scenario, the assignment index information may be a sidelink assignment index (SAI) information.

In some embodiments, the determining, by the terminal device, whether to transmit the HARQ-ACK according to the reception of at least one the first physical channel and/or at least one the second physical channel, and an assignment index information may include:

- when the terminal device receives only the first physical channel and the assignment index information indicates a preset value, the terminal device may not transmit the HARQ-ACK information; or
- when the terminal device does not receive the second physical channel and the assignment index information indicates a preset value, the terminal device may not transmit the HARQ-ACK information; or
- when the terminal device receives at least one the first physical channel and does not receive the second physical channel and the assignment index information indicates a preset value, the terminal device may not transmit the HARQ-ACK information; or
- when the terminal device does not receive the first physical channel and does not receive the second physical channel and the assignment index information indicates a preset value, the terminal device may not transmit the HARQ-ACK information.

In some embodiments, the assignment index information indicating a preset value may include one of the following cases.

- at least one assignment index information corresponding to at least one the first physical channel received by the terminal device indicates a preset value; a last assignment index information among at least one assignment index information corresponding to at least one the first physical channel received by the terminal device indicates a preset value; each of the at least one assignment index information corresponding to at least one the first physical channel received by the terminal device indicates a preset value.

In some embodiments, the determining, by the terminal device, whether to transmit the HARQ-ACK according to the reception of at least one the first physical channel and/or at least one the second physical channel, and an assignment index information may include:

when the terminal device receives at least one the first physical channel and/or at least one the second physical channel, and the assignment index information does not indicate a preset value, the terminal device may transmit the HARQ-ACK information; or when the terminal device receives only the first physical channel and the assignment index information does not indicate a preset value, the terminal device may transmit the HARQ-ACK information; or when the terminal device receives at least one the first physical channel and does not receive the second physical channel and the assignment index information does not indicate a preset value, the terminal device may transmit the HARQ-ACK information.

In some embodiments, the assignment index information not indicating a preset value may include: at least one assignment index information corresponding to at least one the first physical channel received by the terminal device does not indicate a preset value.

In some embodiments, the assignment index information may correspond to the first physical channel, or to say, the assignment index information may be in a control information scheduling or activating a transmission of the first physical channel. The assignment index information may include: a count assignment index information in the control information scheduling or activating a transmission of the first physical channel, and/or, a total assignment index information in the control information scheduling or activating a transmission of the first physical channel.

For example, the first physical channel may be a first PDSCH associated with the HARQ process corresponding to the disabled state, and the assignment index information may be C-DAI information and/or T-DAI information in the downlink authorization DCI scheduling or activating a transmission of the first PDSCH. Specifically, in a single-carrier scenario, the assignment index information is C-DAI information; in a multi-carrier aggregation scenario, the DAI information is C-DAI information and/or T-DAI information.

In some embodiments, in a single-carrier scenario, the assignment index information is a count assignment index information in a control information scheduling or activating a transmission of the first physical channel. The count assignment index information indicates a value including at least one of the following cases:

the count assignment index information is configured to indicate, as of the control information, the number of the second physical channels included in the first control channel monitoring occasion group, or the number of physical channels of HARQ-ACK information to be fed back included in the first control channel monitoring occasion group, or the number of the control information corresponding to the physical channels of the HARQ-ACK information to be fed back included in the first control channel monitoring occasion group, or the number of bits of the HARQ-ACK information to be fed back included in the first control channel monitoring occasion group; or as of the control information, when the number of the second physical channels included in the first control channel monitoring occasion group is 0, or the number of the physical channels of the HARQ-ACK information to be fed back included in the first control channel monitoring occasion group is 0, or the number of the control information corresponding to the physical channels of the HARQ-ACK information to be fed back included in the first control channel monitoring occasion group is 0, or the number of bits of the HARQ-ACK information to be fed back included in the first control channel monitoring occasion group is 0, the count assignment index information indicates a preset value.

In some embodiments, in a multi-carrier aggregation scenario, the assignment index information is a count assignment index information and/or a total assignment index information in a control information scheduling or activating a transmission of the first physical channel. In some embodiments, the count assignment index information indicates a value including at least one of the following cases:

the count assignment index information is configured to indicate, as of a time domain position of control channel monitoring occasions corresponding to the control information, the number of the second physical channels included in the first control channel monitoring occasion group, or the number of physical channels of HARQ-ACK information to be fed back included in the first control channel monitoring occasion group, or the number of control information corresponding to physical channels of the HARQ-ACK information to be fed back included in the first control channel monitoring occasion group, or the number of bits of the HARQ-ACK information to be fed back included in the first control channel monitoring occasion group; or.

as of the time domain position of the control channel monitoring occasions corresponding to the control information, when the number of the second physical channels included in the first control channel monitoring occasion group is 0, or the number of the physical channels of the HARQ-ACK information to be fed back included in the first control channel monitoring occasion group is 0, or the number of the control information corresponding to the physical channels of the HARQ-ACK information to be fed back included in the first control channel monitoring occasion group is 0, or the number of bits of the HARQ-ACK information to be fed back included in the first control channel monitoring occasion group is 0, the count assignment index information indicates a preset value.

In some embodiments, the total count assignment index information indicates a value including at least one of the following cases:

the total count assignment index information is configured to indicate as of a time domain position of control channel monitoring occasions corresponding to the control information, the number of the second physical channels included in the first control channel monitoring occasion group, or the number of physical channels of HARQ-ACK information to be fed back included in the first control channel monitoring occasion group, or the number of control information corresponding to physical channels of the HARQ-ACK information to be fed back included in the first control channel monitoring occasion group, or the number of bits of the HARQ-ACK information to be fed back included in the first control channel monitoring occasion group; or as of the time domain position of the control channel monitoring occasions corresponding to the control information, when the number of the second physical channels included in the first control channel monitoring occasion group is 0, or the number of the physical channels of the HARQ-ACK information to be fed back included in the first control channel monitoring occasion group is 0, or the number of the control information corresponding to the physical channels of the HARQ-ACK information to be fed back included in the first control channel monitoring occasion group is 0, or the number of bits of the HARQ-ACK information to be fed back included in the first control channel monitoring occasion group is 0, the total assignment index information indicates a preset value.

For example, for a downlink transmission, the downlink transmissions received by the terminal device within the first PDCCH monitoring occasion group are all PDSCHs associated with the disabled HARQ process, the C-DAI information and/or T-DAI information in the DCIs scheduling the PDSCHs associated with the disabled HARQ process indicate a preset value, and the terminal device determines not to transmit the HARQ-ACK information corresponding to the first PDCCH monitoring occasion group.

In some embodiments, the assignment index information may correspond to the second physical channel, or to say, the assignment index information may be in a control information scheduling or activating a transmission of the second physical channel. The assignment index information may include: a count assignment index information in the control information scheduling or activating a transmission of the second physical channel, and/or, a total assignment index information in the control information scheduling or activating a transmission of the second physical channel.

For example, the second physical channel may be a second PDSCH, the second PDSCH is associated with the HARQ process corresponding to the enabled state, and the assignment index information may be C-DAI information and/or T-DAI information in the downlink authorization DCI scheduling or activating a transmission of the second PDSCH. Specifically, in a single-carrier scenario, the assignment index information is C-DAI information; in a multi-carrier aggregation scenario, the DAI information is C-DAI information and/or T-DAI information.

In some embodiments, in a single-carrier scenario, the assignment index information is a count assignment index information in a control information scheduling or activating a transmission of the second physical channel. The count assignment index information is configured to indicate, as of the control information, the number of the second physical channels included in the first control channel monitoring occasion group, or the number of physical channels of HARQ-ACK information to be fed back included in the first control channel monitoring occasion group, or the number of control information corresponding to physical channels of the HARQ-ACK information to be fed back included in the first control channel monitoring occasion group, or the number of bits of the HARQ-ACK information to be fed back included in the first control channel monitoring occasion group.

In some embodiments, in a multi-carrier aggregation scenario, the assignment index information is a count assignment index information and/or a total assignment index information in a control information scheduling or activating a transmission of the second physical channel.

In some embodiments, the count assignment index information is configured to indicate, an ordering of the second physical channel scheduled or activated by the control information in at least one second physical channel corresponding to the first control channel monitoring occasion group, or an ordering of the second physical channel scheduled or activated by the control information in physical channels of the HARQ-ACK information to be fed back corresponding to the first control channel monitoring occasion group, or an ordering of the control information in the control information corresponding to the physical channel of the HARQ-ACK information to be fed back corresponding to the first control channel monitoring occasion group, or an ordering of the control information or HARQ-ACK information corresponding to the second physical channel scheduled or activated by the control information in the HARQ-ACK information to be fed back corresponding to the first control channel monitoring occasion group.

In some embodiments, the total assignment index information is configured to indicate, as of a time domain position of control channel monitoring occasions corresponding to the control information, the number of the second physical channels included in the first control channel monitoring occasion group, or the number of physical channels of HARQ-ACK information to be fed back included in the first control channel monitoring occasion group, or the number of control information corresponding to the physical channels of the HARQ-ACK information to be fed back included in the first control channel monitoring occasion group, or the number of bits of the HARQ-ACK information to be fed back included in the first control channel monitoring occasion group.

In some embodiments, the first control channel monitoring occasion group corresponds to a first feedback time unit, and when the terminal device receives only the first physical channel (or does not receive the second physical channel) in the first control channel monitoring occasion group, the terminal device does not feedback the HARQ-ACK information corresponding to the first control channel monitoring occasion group on the first feedback time unit.

In some embodiments, the first feedback time unit is a first PUCCH time slot, and the first PDCCH monitoring occasion group corresponds to a first PUCCH resource in the first PUCCH time slot. When all received by the terminal device in the first PDCCH monitoring occasion group is DCIs scheduling PDSCHs of the HARQ process corresponding to the disabled state, the terminal device does not feedback the HARQ-ACK information.

For example, when the terminal device receives only DCIs, such as DCI format 1_0 or DCI format 1_1 or DCI format 12, scheduling the PDSCH of the HARQ process corresponding to the disabled state in the PDCCH monitoring occasion group corresponding to the HARQ feedback window (i.e., the first PDCCH monitoring occasion group), the terminal device does not transmit the HARQ-ACK information on the first PUCCH.

In some embodiments, the first feedback time unit is a first PUCCH time slot, and the first PDCCH monitoring occasion group corresponds to a first PUCCH resource in the first PUCCH time slot. For a PDSCH corresponding to a first group label, when all received by the terminal device in the first PDCCH monitoring occasion group is DCIs scheduling PDSCHs of the HARQ process corresponding to the disabled state, the terminal device does not feedback the HARQ-ACK information corresponding to the first group label on the first PUCCH resource. The first group label includes group 0 and/or group 1.

In some embodiments, the first feedback time unit is a first PUCCH time slot, and the first PDCCH monitoring occasion group corresponds to a first PUCCH resource in the first PUCCH time slot. For a PDSCH corresponding to a first sub-codebook, when all received by the terminal device in the first PDCCH monitoring occasion group is DCIs scheduling PDSCHs of the HARQ process corresponding to the disabled state, the terminal device does not feedback the HARQ-ACK information corresponding to that first sub-codebook on the first PUCCH resource. The first sub-codebook includes a first-numbered sub-codebook and/or a second-numbered sub-codebook. In some embodiments, the first-numbered sub-codebook is HARQ-ACK information based on TB feedback, and the second-numbered sub-codebook is HARQ-ACK information based on CBG feedback; alternatively, the first-numbered sub-codebook is HARQ-ACK information corresponding to the group 0, and the second-numbered sub-codebook is HARQ-ACK information corresponding to the group 1.

In some embodiments, the first control channel monitoring occasion group corresponds to a first feedback time unit. When the terminal device receives only the first physical channel (or does not receive the second physical channel) in the first control channel monitoring occasion group, and the count assignment index information and/or the total assignment index information corresponding to all the first physical information in at least one the first physical channel received by the terminal device indicates a preset value, the terminal device does not feedback the HARQ-ACK information corresponding to the first control channel monitoring occasion group on the first feedback time unit.

In some embodiments, the first feedback time unit is a first PUCCH time slot, the first PDCCH monitoring occasion group corresponds to a first PUCCH resource in the first PUCCH time slot. When all received by the terminal device receives in the first PDCCH monitoring occasion group is DCIs scheduling PDSCHs of the HARQ process corresponding to the disabled state, and the C-DAI information and/or T-DAI information of all DCIs received by the terminal device indicates a same value, the terminal device does not feedback the HARQ-ACK information on the first PUCCH resource.

In some embodiments, the first feedback time unit is a first PUCCH time slot, the first PDCCH monitoring occasion group corresponds to a first PUCCH resource in the first PUCCH time slot. When all received by the terminal device receives in the first PDCCH monitoring occasion group is DCIs scheduling PDSCHs of the HARQ process corresponding to the disabled state, and the C-DAI information and/or T-DAI information of all DCIs received by the terminal device indicates a preset value, the terminal device does not feedback the HARQ-ACK information on the first PUCCH resource.

For example, when the terminal device receives only DCIS, such as DCI format 1_0 or DCI format 1_1 or DCI format 12, scheduling the PDSCH of the HARQ process corresponding to the disabled state in the PDCCH monitoring occasion group corresponding to the HARQ feedback window (i.e., the first PDCCH monitoring occasion group), and the C-DAI information and/or T-DAI information in all the DCIS received by the terminal device indicates 4, the terminal device does not transmit the HARQ-ACK information on the first PUCCH.

In some embodiments, the first feedback time unit is a first PUCCH time slot, and the first PDCCH monitoring occasion group corresponds to a first PUCCH resource in the first PUCCH time slot. For a PDSCH corresponding to a first group of label, when all received by the terminal device in the first PDCCH monitoring occasion group is DCIs scheduling PDSCHs of the HARQ process corresponding to the disabled state, and the C-DAI information and/or T-DAI information in all DCIs corresponding to the first group label received by the terminal device indicates a preset value, the terminal device does not feedback the HARQ-ACK information corresponding to the first group label on the first PUCCH resource. The first group label includes group 0 and/or group 1.

In some embodiments, the first feedback time unit is a first PUCCH time slot, and the first PDCCH monitoring occasion group corresponds to a first PUCCH resource in the first PUCCH time slot. For a PDSCH corresponding to the first sub-codebook, when all received by the terminal device in the first PDCCH monitoring occasion group is DCIs scheduling PDSCHs of the HARQ process corresponding to the disabled state, and the C-DAI information and/or T-DAI information in all DCIs corresponding to the first sub-codebook received by the terminal device indicates a preset value, the terminal device does not feedback the HARQ-ACK information corresponding to the first sub-codebook on the first PUCCH resource. The first sub-codebook includes a first-numbered sub-codebook and/or a second-numbered sub-codebook. In some embodiments, the first-numbered sub-codebook is HARQ-ACK information based on TB feedback, and the second-numbered sub-codebook is HARQ-ACK information based on CBG feedback; alternatively, the first-numbered sub-codebook is HARQ-ACK information corresponding to the group 0, and the second-numbered sub-codebook is HARQ-ACK information corresponding to the group 1.

In some embodiments, the first PDCCH monitoring occasion group corresponds to a first PUCCH resource in a first PUCCH time slot. When the terminal device is scheduled to transmit the first PUSCH in the first PUCCH time slot, where the first PUSCH resource partially or fully overlaps with the first PUCCH resource in the time domain, the terminal device transmits the HARQ-ACK information. The DCI for scheduling a transmission of the first PUSCH is an uplink authorization DCI.

That is, the first control channel monitoring occasion group corresponds to a first shared channel resource in the first feedback time unit, which may mean: the first control channel monitoring occasion group corresponds to a first feedback resource in the first feedback time unit, and when the terminal device is scheduled to transmit the first shared channel in the first feedback time unit, where the first shared channel resource partially or fully overlaps with the first feedback resource in the time domain, the terminal device transmits the HARQ-ACK information through the first shared channel.

In some embodiments, DAI information may not be included in the uplink authorization DCI.

In some embodiments, the first control channel monitoring occasion group corresponds to a first shared channel resource in the first feedback time unit, and when the terminal device receives only the first physical channel (or does not receive the second physical channel) in the first control channel monitoring occasion group, the terminal device does not feedback the HARQ-ACK information corresponding to the first control channel monitoring occasion group on the first shared channel.

In some embodiments, the first feedback time unit is a first PUCCH time slot, and the first PDCCH monitoring occasion group corresponds to a first PUSCH resource in the first PUCCH time slot. When all received by the terminal device in the first PDCCH monitoring occasion group is DCIs scheduling PDSCHs of the HARQ process corresponding to the disabled state, the terminal device does not feedback the HARQ-ACK information on the first PUSCH resource.

For example, when the terminal device receives only DCIs, such as DCI format 1_0 or DCI format 1_1 or DCI format 1_2, scheduling the PDSCH of the HARQ process corresponding to the disabled state in the PDCCH monitoring occasion group corresponding to the HARQ feedback window (i.e., the first PDCCH monitoring occasion group), the terminal device does not transmit the HARQ-ACK information on the first PUSCH.

In some embodiments, the first feedback time unit is a first PUCCH time slot, and the first PDCCH monitoring occasion group corresponds to a first PUSCH resource in the first PUCCH time slot. For a PDSCH corresponding to a first group label, when all received by the terminal device in the first PDCCH monitoring occasion group is DCIs scheduling PDSCHs of the HARQ process corresponding to the disabled state, the terminal device does not feedback the HARQ-ACK information corresponding to the first group label on the first PUSCH resource. The first group label includes group 0 and/or group 1.

In some embodiments, the first feedback time unit is a first PUCCH time slot, and the first PDCCH monitoring occasion group corresponds to a first PUSCH resource in the first PUCCH time slot. For a PDSCH corresponding to a first sub-codebook, when all received by the terminal device in the first PDCCH monitoring occasion group is DCIs scheduling PDSCHs of the HARQ process corresponding to the disabled state, the terminal device does not feedback the HARQ-ACK information corresponding to the first sub-codebook on the first PUSCH resource. The first sub-codebook includes a first-numbered sub-codebook and/or a second-numbered sub-codebook. In some embodiments, the first-numbered sub-codebook is HARQ-ACK information based on TB feedback, and the second-numbered sub-codebook is HARQ-ACK information based on CBG feedback; alternatively, the first-numbered sub-codebook is HARQ-ACK information corresponding to the group 0, and the second-numbered sub-codebook is HARQ-ACK information corresponding to the group 1.

In some embodiments, DAI information may be included in the uplink authorization DCI. The first physical channel and/or the second physical channel may each be a downlink physical channel, and the assignment index information may be DAI information in a control information scheduling a transmission of an uplink physical channel. The uplink physical channel may correspond to HARQ-ACK information corresponding to the first control channel monitoring occasion group.

In some embodiments, the DAI information indicates a value including at least one of the following cases:

the DAI information is configured to indicate the number of the second physical channels included in the first control channel monitoring occasion group, or the number of physical channels of HARQ-ACK information to be fed back included in the first control channel monitoring occasion group, or the number of control information corresponding to the physical channels of the HARQ-ACK information to be fed back included in the first control channel monitoring occasion group, or the number of bits of the HARQ-ACK information to be fed back included in the first control channel monitoring occasion group; or when the number of the second physical channels included in the first control channel monitoring occasion group is 0, or the number of the physical channels of the HARQ-ACK information to be fed back included in the first control channel monitoring occasion group is 0, or the number of the control information corresponding to the physical channels of the HARQ-ACK information to be fed back included in the first control channel monitoring occasion group is 0, or the number of bits of the HARQ-ACK information to be fed back included in the first control channel monitoring occasion group is 0, the DAI information indicates a preset value.

In some embodiments, the first control channel monitoring occasion group corresponds to a first shared channel resource in the first feedback time unit, and when the terminal device receives only the first physical channel (or does not receive the second physical channel) in the first control channel monitoring occasion group, and the assignment index information in scheduling the first shared channel received by the terminal device indicates a preset value, the terminal device does not feedback the HARQ-ACK information corresponding to the first control channel monitoring occasion group on the first shared channel.

In some embodiments, the first feedback time unit is a first PUCCH time slot, and the first PDCCH monitoring occasion group corresponds to a first PUSCH resource in the first PUCCH time slot. When all received by the terminal device in the first PDCCH monitoring occasion group is DCIs scheduling PDSCHs of the HARQ process corresponding to the disabled state, and the DAI information in the uplink authorization DCI scheduling a transmission of the first PUSCH received by the terminal device indicates a preset value, the terminal device does not feedback the HARQ-ACK information on the first PUSCH resource.

For example, when the terminal device receives only DCIS, such as DCI format 1_0 or DCI format 1_1 or DCI format 12, scheduling the PDSCH of the HARQ process corresponding to the disabled state in the PDCCH monitoring occasion group corresponding to the HARQ feedback window (i.e., the first PDCCH monitoring occasion group), and the DAI information in the uplink authorization DCI scheduling a transmission of the first PUSCH received by the terminal device indicates 4, the terminal device does not transmit the HARQ-ACK information on the first PUSCH.

In some embodiments, the first feedback time unit is a first PUCCH time slot, and the first PDCCH monitoring occasion group corresponds to a first PUSCH resource in the first PUCCH time slot. For a PDSCH corresponding to a first group label, when all received by the terminal device in the first PDCCH monitoring occasion group is DCIs scheduling PDSCHs of the HARQ process corresponding to the disabled state, and the DAI information corresponding to the first group label in the uplink authorization DCI scheduling a transmission of the first PUSCH received by the terminal device indicates a preset value, the terminal device does not feedback the HARQ-ACK information corresponding to the first group label on the first PUSCH resource. The first group labeling includes group 0 and/or group 1.

In some embodiments, the first feedback time unit is a first PUCCH time slot, and the first PDCCH monitoring occasion group corresponds to a first PUSCH resource in the first PUCCH time slot. For a PDSCH corresponding to a first sub-codebook, when all received by the terminal device in the first PDCCH monitoring occasion group is DCIs scheduling PDSCHs of the HARQ process corresponding to the disabled state, and the DAI information corresponding to the first sub-codebook in the uplink authorization DCI scheduling a transmission of the first PUSCH corresponding to the first sub-codebook received by the terminal device indicates a preset value, the terminal device does not feedback the HARQ-ACK information corresponding to the first sub-codebook on the first PUSCH resource. The first sub-codebook includes a first-numbered sub-codebook and/or a second-numbered sub-codebook. In some embodiments, the first-numbered sub-codebook is HARQ-ACK information based on TB feedback, and the second-numbered sub-codebook is HARQ-ACK information based on CBG feedback; alternatively, the first-numbered sub-codebook is HARQ-ACK information corresponding to the group 0, and the second-numbered sub-codebook is HARQ-ACK information corresponding to the group 1.

In some embodiments, the preset value may be 0; or, the preset value may be N powers of 2, where N is an integer and N may represent a number of bits corresponding to the assignment index information. For example, when the assignment index information corresponds to 2 bits, the preset value may be 4 (i.e., 2 powers of 2); or, when the assignment index information corresponds to 1 bit, the preset value may be 2 (i.e., 1 power of 2).

In some embodiments, when the terminal device determines to transmit the HARQ-ACK information, the terminal device may determine the size of the HARQ-ACK information according to the value indicated by the assignment index information.

In some embodiments, the terminal device may determine the value indicated by the assignment index information by at least one of the following methods:

- when the assignment index information corresponding to the first physical channel received by the terminal device indicates a preset value, and the terminal device does not receive the second physical channel before the first physical channel, the terminal device may determine that the assignment index information indicates 0; or
- when the assignment index information corresponding to the first physical channel received by the terminal device indicates M, and the terminal device receives S second physical channels before the first physical channel, the terminal device may determine that the assignment index information indicates $k*2^N+M$; where M is an integer, S is a positive integer, k is the largest integer that satisfies $k*2^N \le S$, $2^N$ is N powers of 2, N is the number of bits corresponding to the assignment index information; or
- when the assignment index information corresponding to a last second physical channel received by the terminal device indicates M, and the terminal device receives S second physical channels, the terminal device may determine that the assignment index information indicates $k*2^N+M$; where M is an integer, S is a positive integer, k is the largest integer that satisfies $k*2^N \le S$, $2^N$ is N powers of 2, and N is the number of bits corresponding to the assignment index information; or
- when the assignment index information corresponding to a last physical channel received by the terminal device indicates M, and the terminal device receives S second physical channels, the terminal device may determine that the assignment index information indicates $k*2^N+M$; where the last physical channel is the first physical channel or the second physical channel; M is an integer, S is a positive integer, k is the largest integer that satisfies $k*2^N \le S$, $2^N$ is N powers of 2, and N is the number of bits corresponding to the assignment index information.

The following description is provided, taking a single-carrier scenario, downlink transmission, and assignment index information as C-DAI of 2 bits as an example.

As shown in Table 1, the preset value is 4 (i.e., 2 powers of 2), the DAI domain takes a value M from 1 to 4, and the terminal device determines an X value according to the DAI domain value and the reception of the first physical channel and/or the second physical channel.

The first physical channel includes: a PDSCH corresponding to the disabled state scheduled by a PDCCH in the first PDCCH monitoring occasion group.

The second physical channel includes: a PDSCH corresponding to the enabled state scheduled by a PDCCH in the first PDCCH monitoring occasion group, or a PDCCH indicating a semi-continuously scheduled PDSCH release (SPS PDSCH release), or a PDCCH corresponding to DCI format 1_1 and indicating a secondary cell dormancy (SCell dormancy).

The X value is configured to indicate, as of the DCI corresponding to the C-DAI, the number of the second physical channels included in the first PDCCH monitoring occasion group, or the number of physical channels of the HARQ-ACK information to be fed back included in the first control channel monitoring occasion group, or the number of DCIs corresponding to the physical channels of the HARQ-ACK information to be fed back included in the first control channel monitoring occasion group, or the number of bits of the HARQ-ACK information to be fed back included in the first control channel monitoring occasion group.

TABLE 1

DAI values corresponding to 2 bits

| DAI most significant bit (MSB), least significant bit (LSB) | Value M of DAI domain | X ≥ 1, X indicates the number of PDSCHs corresponding to the enabled state scheduled by PDCCHs in the first PDCCH monitoring occasion group, or the number of PDCCHs indicating SPS PDSCH release, or the number of PDCCHs corresponding to DCI format 1__1 and indicating SCell dormancy |
|---|---|---|
| 0, 0 | 1 | (X − 1) mod 4 + 1 = 1 |
| 0, 1 | 2 | (X − 1) mod 4 + 1 = 2 |
| 1, 0 | 3 | (X − 1) mod 4 + 1 = 3 |
| 1, 1 | 4 | (X − 1) mod 4 + 1 = 4 |

In an example, assuming that the C-DAI information in the DCI carried by the last PDCCH received by the terminal device in the first PDCCH monitoring occasion group takes the value M=3, the terminal device may determine the number of the second physical channels included in the first PDCCH monitoring occasion group according to M=3 (or to say, determine the number of the physical channels of the HARQ-ACK information to be fed back included in the first PDCCH monitoring occasion group). Specifically, one of the following cases may be included:

when the terminal device does not receive the second physical channel in the first PDCCH monitoring occasion group (i.e., the number of the second physical channels received is 0), the terminal device determines that X=3;

- when the number of the second physical channels received by the terminal device in the first PDCCH monitoring occasion group is greater than or equal to 1 and less than or equal to 3, the terminal device determines that X=3;

- when the number of the second physical channels received by the terminal device in the first PDCCH monitoring occasion group is greater than or equal to 4 and less than or equal to 7, the terminal device determines that X=7;
- by analogy, when the number of the second physical channels received by the terminal device in the first PDCCH monitoring occasion group is greater than or equal to $(k-1)*2^N+M+1$ and less than or equal to $k*2^N+M$, the terminal device determines that $X=k*2^N+M$, where k is an integer and $2^N=4$.

In another example, assuming that the C-DAI information in the DCI carried by the last PDCCH received by the terminal device in the first PDCCH monitoring occasion group takes the value M=4, the terminal device may determine the number of the second physical channels included in the first PDCCH monitoring occasion group according to M=4 (or to say, determine the number of the physical channels of the HARQ-ACK information to be fed back included in the first PDCCH monitoring occasion group). Specifically, one of the following cases may be included:

- when the terminal device does not receive the second physical channel in the first PDCCH monitoring occasion group (i.e., the number of the second physical channels received is 0), since the terminal device determines that the C-DAI information takes the preset value M=4, the terminal device determines that X=0;
- when the number of the second physical channels received by the terminal device in the first PDCCH monitoring occasion group is greater than or equal to 1 and less than or equal to 4, the terminal device determines that X=4;
- when the number of the second physical channels received by the terminal device in the first PDCCH monitoring occasion group is greater than or equal to 5 and less than or equal to 8, the terminal device determines that X=8;
- by analogy, when the number of the second physical channels received by the terminal device in the first PDCCH monitoring occasion group is greater than or equal to $(k-1)*2^N+M+1$ and less than or equal to $k*2^N+M$, and the number of the second physical channels received is not 0, the terminal device determines that $X=k*2^N+M$, where k is an integer and $2^N=4$.

It can be understood that when the terminal device determines the value X, the terminal device may correspondingly determine information such as the number of the second physical channels included in the first PDCCH monitoring occasion group, or the number of the physical channels of the HARQ-ACK information to be fed back in the first PDCCH monitoring occasion group, or the number of DCIs corresponding to the physical channels of the HARQ-ACK information to be fed back in the first PDCCH monitoring occasion group, or the number of bits of the HARQ-ACK information to be fed back in the first PDCCH monitoring occasion group. When the terminal device determines that X takes the value of 0, the terminal device may not feedback the corresponding HARQ-ACK information.

In the embodiments, when the terminal device is configured with a certain HARQ process or processes corresponding to the disabled state, the terminal device is required to determine whether it is necessary to transmit HARQ-ACK information on the corresponding PUCCH or PUSCH or determine the size of the HARQ-ACK information to be transmitted on the corresponding PUCCH or PUSCH, according to the transmission of a physical channel, such as a PDSCH, of the HARQ process corresponding to the disabled state, and/or a value of the assignment index information field in the DCI scheduling the PDSCH corresponding to the disabled state, thereby ensuring that the network device and the terminal device have a consistent understanding of the size of the HARQ-ACK information to be transmitted.

A variety of ways for the terminal device to determine whether to transmit HARQ-ACK information and to determine the size of the HARQ-ACK information to be transmitted are described in the above embodiments, and the following examples are based on different scenarios under single-carrier and multi-carrier. For ease of understanding, the following embodiments are illustrated with the first physical channel and the second physical channel being PDSCH, the first state being the disabled state and the second state being the enabled state as an example.

Figure 4:
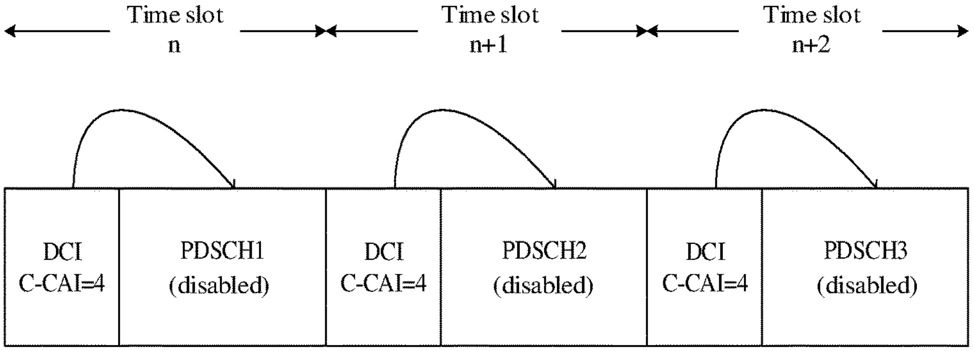
FIG. 4 is a schematic view of a control channel monitoring occasion group according to other embodiments of the present disclosure.
Figure 5:
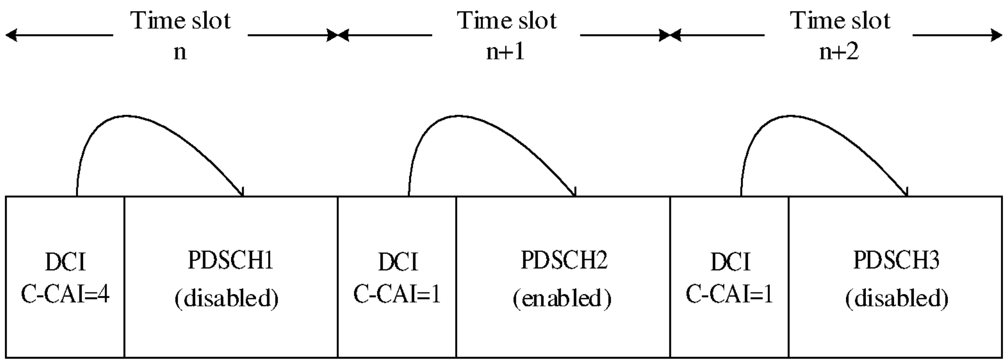
FIG. 5 is a schematic view of a control channel monitoring occasion group according to further other embodiments of the present disclosure.

For convenience of description, for a single-carrier scenario, as shown in FIG. 3, FIG. 4, or FIG. 5, the first control channel monitoring occasion group (i.e., the first PDCCH monitoring occasion group) includes three PDCCH monitoring occasions, which correspond to time slot n, time slot n+1, and time slot n+2, respectively, and n is an integer. The PDCCH monitoring occasions in the first PDCCH monitoring occasion group are sorted in the following manner: time slot n, time slot n+1, and time slot n+2. The DCI in the PDCCH includes C-DAI information.

Figure 7:
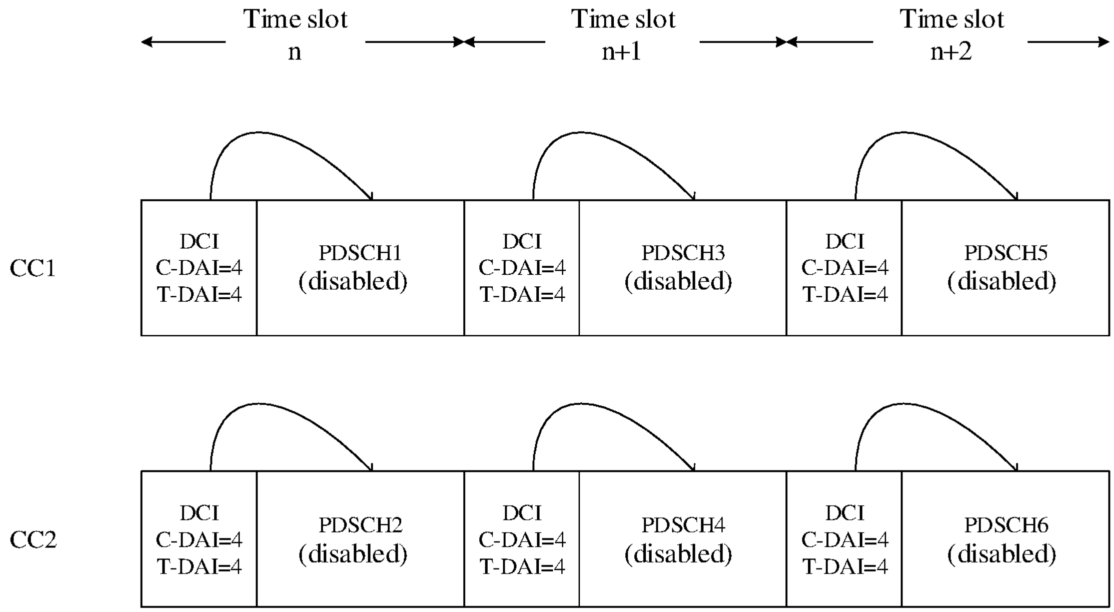
FIG. 7 is a schematic view of a control channel monitoring occasion group according to yet other embodiments of the present disclosure.
Figure 8:
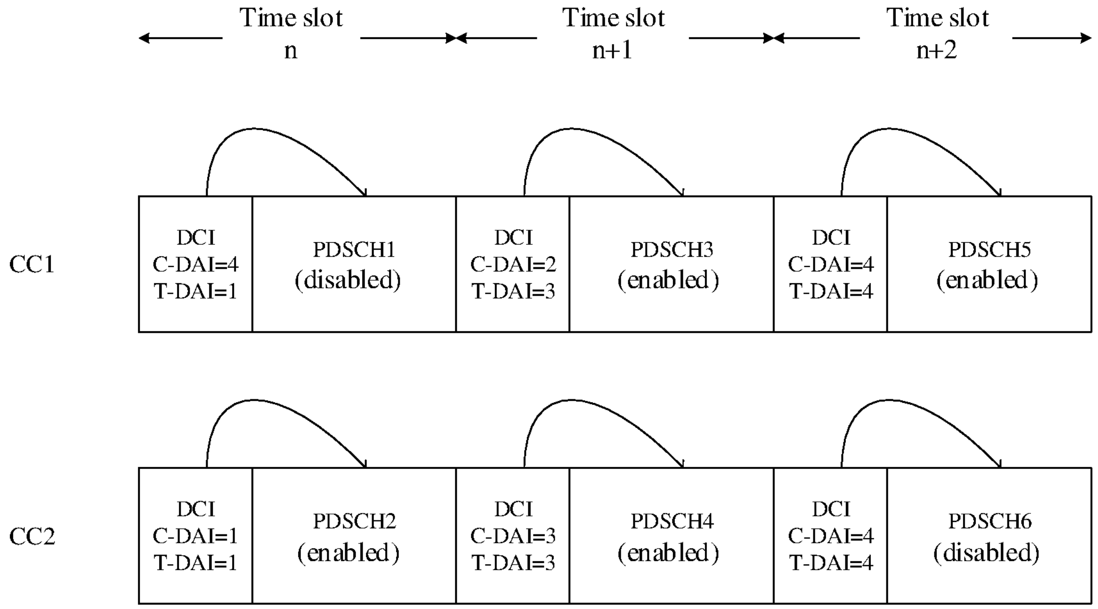
FIG. 8 is a schematic view of a control channel monitoring occasion group according to yet other embodiments of the present disclosure.

For a multi-carrier scenario, as shown in FIG. 6, FIG. 7, or FIG. 8, the first control channel monitoring occasion group (i.e., the first PDCCH monitoring occasion group) includes PDCCH monitoring occasions on two CCs. Three PDCCH monitoring occasions included on the activated BWPs on CC1 and three PDCCH monitoring occasions included on the activated BWPs on CC2 both correspond to the time slot n, time slot n+1, and time slot n+2. The PDCCH monitoring occasions in the first PDCCH monitoring occasion group are sorted as follows: the time slot n of CC1, the time slot n of CC2, the time slot n+1 of CC1, the time slot n+1 of CC2, the time slot n+2 of CC1, and the time slot n+2 of CC2. The DCI herein includes C-DAI information and T-DAI information as an example. It should be understood that for some DCI formats such as DCI format 1_0 or DCI format 12, even for multi-carrier scenarios, only C-DAI information may be included.

In an example, for a single-carrier scenario, in a DCI that schedules PDSCH transmission using a HARQ process that is not configured to be disabled (or is configured to be enabled), the corresponding C-DAI information is configured to indicate, as of the current DCI, the number of downlink transmissions of HARQ-ACK information to be fed back of the terminal device; in a DCI that schedules PDSCH transmission using a HARQ process configured to be disabled, the corresponding C-DAI information is configured to indicate, as of the current DCI, the number of downlink transmissions of HARQ-ACK information to be fed back of the terminal device; in a DCI that schedules PDSCH transmission using a HARQ process configured to be disabled, when the number of downlink transmissions of HARQ-ACK information to be fed back of the terminal device as of the current DCI is 0, the corresponding C-DAI information indicates a preset value, for example, 4.

For example, as shown in FIG. 3, in the first PDCCH monitoring occasion group, when the scheduling of the first PDSCH received by the terminal device, i.e., PDSCH1, corresponds to the enabled HARQ process, the corresponding C-DAI information indicates 1; when the scheduling of the second PDSCH received, i.e., PDSCH2, corresponds to the enabled HARQ process, the corresponding C-DAI information indicates 2; when the scheduling of the third PDSCH received, i.e., PDSCH3, corresponds to the enabled HARQ process, the corresponding C-DAI information indicates the number of downlink transmissions of the HARQ-ACK information to be fed back, i.e., indicates 2.

In some embodiments, when the first PDCCH monitoring occasion group corresponds to the first PUCCH resource in the first feedback time slot, the terminal device determines that the number of downlink transmissions of the HARQ-ACK information to be fed back is 2 according to the C-DAI information in the last downlink authorization DCI, and accordingly, the terminal device sends the HARQ-ACK information corresponding to the 2 downlink transmissions.

In some embodiments, when the first PDCCH monitoring occasion group corresponds to the first PUSCH resource in the first feedback time slot, and the uplink authorization DCI for scheduling the first PUSCH transmission does not include DAI information, the terminal device determines that the number of downlink transmissions of the HARQ-ACK information to be fed back is 2 according to the C-DAI information in the last downlink authorization DCI, and accordingly, the terminal device sends the HARQ-ACK information corresponding to the 2 downlink transmissions through the first PUSCH resource.

In some embodiments, the first PDCCH monitoring occasion group corresponds to the first PUSCH resource in the first feedback time slot, and the uplink authorization DCI for scheduling the first PUSCH transmission includes DAI information, the terminal device determines that the number of downlink transmissions of the HARQ-ACK information to be fed back, for example, to be 2 according to the DAI information in the uplink authorization DCI, and accordingly, the terminal device sends the HARQ-ACK information corresponding to the 2 downlink transmissions through the first PUSCH resource.

For example, as shown in FIG. 4, in the first PDCCH monitoring occasion group, when the scheduling of the first PDSCH, i.e., PDSCH1, received by the terminal device corresponds to the disabled HARQ process, the corresponding C-DAI information indicates a preset value of 4; when the scheduling of the second PDSCH received, i.e., PDSCH2, corresponds to the disabled HARQ process, the corresponding C-DAI information indicates 4; when the scheduling of the third PDSCH received, i.e., PDSCH3, corresponds to the disabled HARQ process, the corresponding C-DAI information indicates 4.

In some embodiments, the first PDCCH monitoring occasion group corresponds to a first PUCCH resource in the first feedback time slot, and when all received by the terminal device in the first PDCCH monitoring occasion group is PDSCH transmissions corresponding to the disabled HARQ process and the C-DAI information corresponding to the PDSCHs all indicate a preset value, the terminal device does not send the HARQ-ACK information corresponding to the first PDCCH monitoring occasion group through the first PUCCH resource.

In some embodiments, the first PDCCH monitoring occasion group corresponds to a first PUSCH resource in the first feedback time slot, and the uplink authorization DCI for scheduling the first PUSCH transmissions does not include DAI information; when all received by the terminal device in the first PDCCH monitoring occasion group is PDSCH transmissions corresponding to the disabled HARQ process and the C-DAI information corresponding to the PDSCHs all indicate a preset value, the terminal device does not send the HARQ-ACK information corresponding to the first PDCCH monitoring occasion group through the first PUSCH resource.

In some embodiments, the first PDCCH monitoring occasion group corresponds to a first PUSCH resource in the first feedback time slot, and the uplink authorization DCI for scheduling the first PUSCH transmission includes DAI information; when all received by the terminal device in the first PDCCH monitoring occasion group is PDSCH transmissions corresponding to the disabled HARQ process and the DAI information in the uplink authorization DCI indicates a preset value such as 4, the terminal device does not send the HARQ-ACK information corresponding to the first PDCCH monitoring occasion group through the first PUSCH resource.

For example, as shown in FIG. 5, in the first PDCCH monitoring occasion group, when the scheduling of the first PDSCH, i.e., PDSCH1, received by the terminal device corresponds to the disabled HARQ process, the corresponding C-DAI information indicates a preset value of 4; when the scheduling of the second PDSCH received, i.e., PDSCH2, corresponds to the enabled HARQ process, the corresponding C-DAI information indicates 1; when the scheduling of the third PDSCH received, i.e., PDSCH3, corresponds to the disabled HARQ process, the corresponding C-DAI information indicates the number of downlink transmissions of the HARQ-ACK information to be fed back, i.e., indicates 1.

In some embodiments, when the first PDCCH monitoring occasion group corresponds to a first PUCCH resource in the first feedback time slot, the terminal device determines that the number of downlink transmissions of the HARQ-ACK information to be fed back is 1 according to the C-DAI information in the last downlink authorization DCI, and accordingly, the terminal device sends the HARQ-ACK information corresponding to the 1 downlink transmission.

In some embodiments, when the first PDCCH monitoring occasion group corresponds to a first PUSCH resource in the first feedback time slot, and the uplink authorization DCI for scheduling the first PUSCH transmission does not include DAI information, the terminal device determines that the number of downlink transmissions of the HARQ-ACK information to be fed back is 1 according to the C-DAI information in the last downlink authorization DCI, and accordingly, the terminal device sends the HARQ-ACK information corresponding to the 1 downlink transmission through the first PUSCH resource.

In some embodiments, when the first PDCCH monitoring occasion group corresponds to a first PUSCH resource in the first feedback time slot, and the uplink authorization DCI for scheduling the first PUSCH transmission includes DAI information, the terminal device determines the number of downlink transmissions of the HARQ-ACK information to be fed back, for example, to be 1, according to the DAI information in the uplink authorization DCI, and accordingly, the terminal device sends the HARQ-ACK information corresponding to the 1 downlink transmission through the first PUSCH resource.

In an example, for a multi-carrier scenario, in a DCI that schedules PDSCH transmissions using a HARQ process that is not configured to be disabled (or is configured to be enabled), the corresponding C-DAI information is configured to indicate an ordering of downlink transmissions scheduled by the current DCI among downlink transmissions of the HARQ-ACK information to be fed back of the terminal device, and the corresponding T-DAI information is configured to indicate, as of a time slot of a PDCCH monitoring occasion corresponding to the current DCI, the number of downlink transmissions of the HARQ-ACK information to be fed back of the terminal device; in a DCI that schedules PDSCH transmissions using a HARQ process configured to be disabled, the corresponding C-DAI information and/or T-DAI information is configured to indicate, as of the time slot of the PDCCH monitoring occasion corresponding to the current DCI, the number of downlink transmissions of the HARQ-ACK information to be fed back of the terminal device; in a DCI that schedules PDSCH transmissions using a HARQ process configured to be disabled, when the number of downlink transmissions of HARQ-ACK information to be fed back of the terminal device as of the time slot of the PDCCH monitoring occasion corresponding to the current DCI is 0, the C-DAI information and/or the T-DAI information indicates a preset value, for example, 4.

For example, as shown in FIG. 6, in the first PDCCH monitoring occasion group, on the time slot n, the terminal device receives a total of 2 PDSCHs corresponding to the enabled HARQ process on two CCs, where the C-DAI information corresponding to the first PDSCH, i.e., PDSCH1, indicates 1 and the T-DAI information corresponding to PDSCH1 indicates 2, and the C-DAI information corresponding to the second PDSCH, i.e., PDSCH2, indicates 2 and the T-DAI information corresponding to PDSCH2 indicates 2. On the time slot n+1, the terminal device receives a total of 1 PDSCH corresponding to the enabled HARQ process on two CCs, where the C-DAI information corresponding to the third PDSCH, i.e., PDSCH3, indicates 3 and the T-DAI information corresponding to PDSCH3 indicates 3, PDSCH3 corresponding to the enabled HARQ process; and the C-DAI information and T-DAI information corresponding to the fourth PDSCH, i.e., PDSCH4, also indicate 3, PDSCH4 corresponding to the disabled HARQ process. On the time slot n+2, the terminal device receives a total of 1 PDSCH corresponding to the enabled HARQ process on two CCs, where the C-DAI information corresponding to the fifth PDSCH, i.e., PDSCH5, indicates 4, and the T-DAI information corresponding to PDSCH5 indicates 4, PDSCH5 corresponding to the enabled HARQ process; and the C-DAI information and T-DAI information corresponding to the sixth PDSCH, i.e., PDSCH6, also indicate 4, PDSCH6 corresponding to the disabled HARQ process.

In some embodiments, when the first PDCCH monitoring occasion group corresponds to a first PUCCH resource in the first feedback time slot, the terminal device determines the number of downlink transmissions of the HARQ-ACK information to be fed back according to the T-DAI information in the last downlink authorization DCI to be 4, and accordingly, the terminal device sends the HARQ-ACK information corresponding to the 4 downlink transmissions through the first PUCCH resource. In some embodiments, when the last downlink authorization DCI corresponds to the scheduling of the disabled HARQ process, the terminal device may determine the number of downlink transmissions of the HARQ-ACK information to be fed back according to the C-DAI information in the last downlink authorization DCI.

In some embodiments, when the first PDCCH monitoring occasion group corresponds to a first PUSCH resource in the first feedback time slot, and the uplink authorization DCI for scheduling the first PUSCH transmission does not include DAI information, the terminal device determines that the number of downlink transmissions of the HARQ-ACK information to be fed back is 4 according to the T-DAI information in the last downlink authorization DCI, and accordingly, the terminal device sends the HARQ-ACK information corresponding to the 4 downlink transmissions through the first PUSCH resource. In some embodiments, when the last downlink authorization DCI corresponds to the scheduling of the disabled HARQ process, the terminal device may determine the number of downlink transmissions of the HARQ-ACK information to be fed back according to the C-DAI information in the last downlink authorization DCI.

In some embodiments, when the first PDCCH monitoring occasion group corresponds to a first PUSCH resource in the first feedback time slot, and the uplink authorization DCI for scheduling the first PUSCH transmission includes DAI information, the terminal device determines the number of downlink transmissions of the HARQ-ACK information to be fed back, for example, to be 4, according to the DAI information in the uplink authorization DCI, and accordingly, the terminal device sends the HARQ-ACK information corresponding to the 4 downlink transmissions through the first PUSCH resource.

For example, as shown in FIG. 7, in the first PDCCH monitoring occasion group, on the time slot n, the scheduling of two PDSCHs, i.e., PDSCH1 and PDSCH2, received by the terminal device on two CCs corresponds to the disabled HARQ process, and the corresponding C-DAI information and/or T-DAI information both indicate a preset value of 4. On the time slot n+1, the scheduling of two PDSCHs, i.e., PDSCH3 and PDSCH4, received by the terminal device on two CCs corresponds to the disabled HARQ process, and the corresponding C-DAI information and/or T-DAI information both indicate a preset value of 4. On the time slot n+2, the scheduling of two PDSCHs, i.e., PDSCH5 and PDSCH6, received by the terminal device on two CCs corresponds to the disabled HARQ process, the corresponding C-DAI information and/or T-DAI information both indicate a preset value of 4.

In some embodiments, the first PDCCH monitoring occasion group corresponds to a first PUCCH resource in the first feedback time slot, and when all received by the terminal device in the first PDCCH monitoring occasion group is PDSCH transmissions corresponding to the disabled HARQ process, and the corresponding C-DAI information and/or T-DAI information corresponding to the PDSCHs indicates a preset value, the terminal device does not send the HARQ-ACK information corresponding to the first PDCCH monitoring occasion group through the first PUCCH resource.

In some embodiments, the first PDCCH monitoring occasion group corresponds to a first PUSCH resource in the first feedback time slot, and the uplink authorization DCI for scheduling the first PUSCH transmissions does not include DAI information; when all received by the terminal device in the first PDCCH monitoring occasion group is PDSCH transmissions corresponding to the disabled HARQ process and the C-DAI information and/or T-DAI information corresponding to the PDSCHs indicates a preset value, the terminal device does not send the HARQ-ACK information corresponding to the first PDCCH monitoring occasion group through the first PUSCH resource.

In some embodiments, the first PDCCH monitoring occasion group corresponds to a first PUSCH resource in the first feedback time slot, and the uplink authorization DCI for scheduling the first PUSCH transmission includes DAI information; when all received by the terminal device in the first PDCCH monitoring occasion group is PDSCH transmissions corresponding to the disabled HARQ process and the DAI information in the uplink authorization DCI indicates a preset value such as 4, the terminal device does not send the HARQ-ACK information corresponding to the first PDCCH monitoring occasion group through the first PUSCH resource.

For example, as shown in FIG. 8, in the first PDCCH monitoring occasion group, on the time slot n, the terminal device receives a total of 1 PDSCH corresponding to the enabled HARQ process on two CCs; the first PDSCH, i.e., PDSCH1, corresponds to the disabled HARQ process, and the C-DAI information corresponding to PDSCH1 indicates 4, and the T-DAI information corresponding to PDSCH1 indicates the number of downlink transmissions of the HARQ-ACK information to be fed back as of the time slot n, i.e., indicates 1; the second PDSCH, i.e., PDSCH2, corresponds to the enabled HARQ process, and the C-DAI information and T-DAI information corresponding to PDSCH2 both indicate 1. On the time slot n+1, the terminal device receives a total of 2 PDSCHs corresponding to the enabled HARQ process on two CCs; where the C-DAI information corresponding to the third PDSCH, i.e., PDSCH3, indicates 2, and the T-DAI Information corresponding to PDSCH3 indicates 3; and the C-DAI information corresponding to the fourth PDSCH, i.e., PDSCH4, indicates 3, and the T-DAI information corresponding to PDSCH4 indicates 3. On the time slot n+2, the terminal device receives a total of 1 PDSCH corresponding to the enabled HARQ process on two CCs; where the fifth PDSCH i.e., PDSCH5, corresponds to the enabled HARQ process; the C-DAI information corresponding to PDSCH5 indicates 4, and the T-DAI information corresponding to PDSCH5 indicates 4; the sixth PDSCH, i.e., PDSCH6, corresponds to the disabled HARQ process; the C-DAI information corresponding to PDSCH6 indicates 4, and the T-DAI information corresponding to PDSCH6 indicates 4.

In some embodiments, when the first PDCCH monitoring occasion group corresponds to a first PUCCH resource in the first feedback time slot, the terminal device determines the number of downlink transmissions of the HARQ-ACK information to be fed back according to the T-DAI information in the last downlink authorization DCI to be 4, and accordingly, the terminal device sends the HARQ-ACK information corresponding to the 4 downlink transmissions through the first PUCCH resource. In some embodiments, when the last downlink authorization DCI corresponds to the scheduling of the disabled HARQ process, the terminal device may determine the number of downlink transmissions of the HARQ-ACK information to be fed back according to the C-DAI information in the last downlink authorization DCI.

In some embodiments, when the first PDCCH monitoring occasion group corresponds to a first PUSCH resource in the first feedback time slot, and the uplink authorization DCI for scheduling the first PUSCH transmission does not include DAI information, the terminal device determines that the number of downlink transmissions of the HARQ-ACK information to be fed back is 4 according to the T-DAI information in the last downlink authorization DCI, and accordingly the terminal device sends the HARQ-ACK information corresponding to the 4 downlink transmissions through the first PUSCH resource. In some embodiments, when the last downlink authorization DCI corresponds to the scheduling of the disabled HARQ process, the terminal device may determine the number of downlink transmissions of the HARQ-ACK information to be fed back according to the C-DAI information in the last downlink authorization DCI.

In some embodiments, when the first PDCCH monitoring occasion group corresponds to a first PUSCH resource in the first feedback time slot, and the uplink authorization DCI for scheduling the first PUSCH transmission includes DAI information, the terminal device determines the number of downlink transmissions of the HARQ-ACK information to be fed back, for example, to be 4, according to the DAI information in the uplink authorization DCI, and accordingly the terminal device sends the HARQ-ACK information corresponding to the 4 downlink transmissions through the first PUSCH resource.

At block S240: determining, by the network device, whether to receive the HARQ-ACK information according to a sending of the first physical channel and/or the second physical channel.

For example, the network device may not receive the HARQ-ACK information when the network device sends only the first physical channel; or, the network device may receive the HARQ-ACK information when the network device sends at least one the second physical channel; or, the network device may receive the HARQ-ACK information when the network device sends at least one the first physical channel and at least one the second physical channel.

In some embodiments, the determining, by the network device, whether to receive the HARQ-ACK information according to a sending of the first physical channel and/or the second physical channel includes: determining, by the network device, whether to receive a HARQ-ACK information according to the sending of at least one the first physical channel and/or at least one the second physical channel in the first control channel monitoring occasion group.

In some embodiments, the network device may determine or set an assignment index information, and determine whether to receive the HARQ-ACK information, according to the sending of at least one the first physical channel and/or at least one the second physical channel.

In some embodiments, the network device may determine or set an assignment index information, and determine whether to receive the HARQ-ACK information, according to the sending of at least one the first physical channel and/or at least one the second physical channel in the first control channel monitoring occasion group.

For example, when the network device sends only the first physical channel, the network device may set the assignment index information to indicate a preset value and not to receive the HARQ-ACK information; or, when the network device sends at least one the second physical channel, the network device may set the assignment index information not to indicate a preset value and to receive the HARQ-ACK information; or, when the network device sends at least one the first physical channel and/or at least one the second physical channel, the network device may set the assignment index information not to indicate a preset value and receive the HARQ-ACK information.

In some embodiments, the assignment index information indicating a preset value may include one of the following cases:

at least one assignment index information corresponding to at least one the first physical channel sent by the network device indicates a preset value; or, a last assignment index information among at least one assignment index information corresponding to at least one the first physical channel sent by the network device indicates a preset value; or, each of the at least one assignment index information corresponding to at least one the first physical channel sent by the network device indicates a preset value.

In some embodiments, the assignment index information not indicating a preset value may include: at least one assignment index information corresponding to at least one the first physical channel sent by the network device does not indicate a preset value.

In some embodiments, the assignment index information not indicating a preset value may include: the assignment index information indicates the number of the second physical channels sent by the network device.

In some embodiments, the assignment index information corresponds to the first physical channel.

In some embodiments, the terminal device is further required to combine the reception of at least one the first physical channel and/or at least one the second physical channel, for determining whether to transmit the HARQ-ACK information. For these cases, the network device and the terminal device may agree in advance to enable the network device to determine the actual reception on the side of the terminal device according to whether the HARQ-ACK information is received and/or the value of the assignment index information.

For example, assuming that the network device sends the first physical channel and the second physical channel to the terminal device, but the terminal device receives only at least one the first physical channel, the terminal device may not transmit the HARQ-ACK information; accordingly, when the network device does not receive the HARQ-ACK information, the network device may determine that the terminal device received only at least one the first physical channel (without receiving any the second physical channel).

As a further example, assuming that the network device sends the second physical channel to the terminal device, but the terminal device does not receive any second physical channel, the terminal device may not transmit the HARQ-ACK information; accordingly, when the network device does not receive the HARQ-ACK information, the network device may determine that the terminal device does not receive any the second physical channel.

Further for example, assuming that the network device sends the first physical channel and the second physical channel to the terminal device, but the terminal device only receives at least one the first physical channel and the assignment index information indicates a preset value, the terminal device may not transmit the HARQ-ACK information; accordingly, when the network device does not receive the HARQ-ACK information, the network device may determine that the terminal device receives only at least one the first physical channel (without receiving any the second physical channel).

In this way, the network device may be informed about the reception of the second physical channel by the terminal device according to the reception of the HARQ-ACK information.

It should be noted that the above several embodiments are only examples and not limitations, and for the various embodiments described above, the network device and the terminal device may agree in advance in accordance with the method described above.

The method embodiments of the present disclosure are described in detail above in conjunction with FIGS. 1 to 8, and the apparatus embodiments of the present disclosure are described in detail below in conjunction with FIGS. 9 to 11. It should be understood that the description of the method embodiments and the description of the apparatus embodiments correspond to each other, such that the parts not described in detail can be found in the preceding method embodiments.

Figure 9:
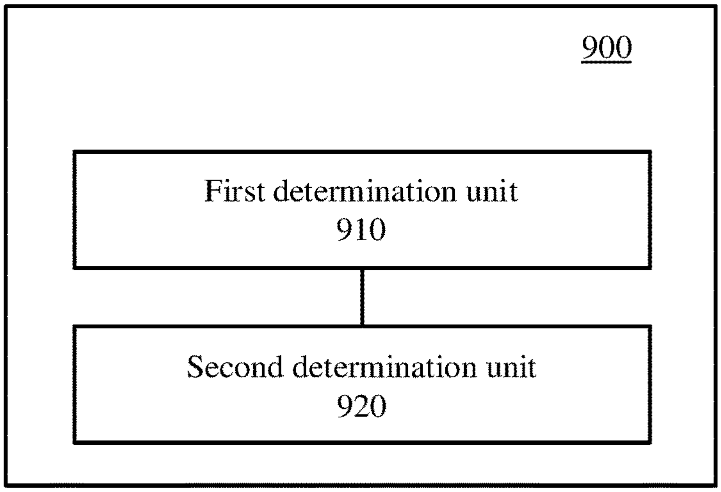
FIG. 9 is a schematic structural view of a communication apparatus according to some embodiments of the present disclosure.

FIG. 9 is a schematic structural view of a communication apparatus according to some embodiments of the present disclosure. The communication apparatus 900 in FIG. 9 includes a first determination unit 910 and a second determination unit 920.

The first determination unit 910 is configured to determine a reception of a first physical channel and/or a second physical channel.

The second determination unit 920 is configured to determine whether to transmit a hybrid automatic repeat-request acknowledgement (HARQ-ACK) information according to the reception of at least one the first physical channel and/or at least one the second physical channel.

In some embodiments, the second determination unit 920 is specifically configured: not to transmit the HARQ-ACK information when the apparatus receives only the first physical channel; or, not to transmit the HARQ-ACK information when the apparatus does not receive the second physical channel; or, not to transmit the HARQ-ACK information when the apparatus receives at least one the first physical channel and does not receive the second physical channel; or, not to transmit the HARQ-ACK information when the apparatus does not receive the first physical channel and does not receive the second physical channel; or, to transmit the HARQ-ACK information when the apparatus receives at least one the second physical channel.

In some embodiments, the second determination unit 920 is specifically configured to: determine whether to transmit the HARQ-ACK information according to the reception of at least one the first physical channel and/or at least one the second physical channel, and an assignment index information.

In some embodiments, the second determination unit 920 is specifically configured: not to transmit the HARQ-ACK information when the apparatus receives only the first physical channel and the assignment index information indicates a preset value; or, not to transmit the HARQ-ACK information when the apparatus does not receive the second physical channel and the assignment index information indicates a preset value; or, not to transmit the HARQ-ACK information when the apparatus receives at least one the first physical channel and does not receive the second physical channel and the assignment index information indicates a preset value; or, not to transmit the HARQ-ACK information when the apparatus does not receive the first physical channel and does not receive the second physical channel and the assignment index information indicates a preset value.

In some embodiments, the assignment index information corresponds to the first physical channel, and the assignment index information indicates a preset value, including one of the following cases: at least one assignment index information corresponding to at least one the first physical channel received by the apparatus indicates a preset value; a last assignment index information among at least one assignment index information corresponding to at least one the first physical channel received by the apparatus indicates a preset value; and each of the at least one assignment index information corresponding to at least one the first physical channel received by the apparatus indicates a preset value.

In some embodiments, the second determination unit 920 is specifically configured to: transmit the HARQ-ACK information when the apparatus receives at least one the first physical channel and/or at least one the second physical channel and the assignment index information does not indicate a preset value; or, transmit the HARQ-ACK information when the apparatus receives only the first physical channel and the assignment index information does not indicate a preset value; or, transmit the HARQ-ACK information when the apparatus receives at least one the first physical channel and does not receive the second physical channel and the assignment index information does not indicate a preset value.

In some embodiments, the assignment index information corresponds to the first physical channel, and the assignment index information does not indicate a preset value, including: at least one assignment index information corresponding to at least one the first physical channel received by the apparatus does not indicate a preset value.

In some embodiments, the assignment index information corresponds to the first physical channel, where the assignment index information is a count assignment index information in a control information scheduling a transmission of the first physical channel; and/or the assignment index information is a total assignment index information in a control information scheduling a transmission of the first physical channel.

In some embodiments, the first physical channel and/or the second physical channel may each be a downlink physical channel, and the assignment index information is DAI information in a control information scheduling a transmission of an uplink physical channel. The uplink physical channel corresponds to the HARQ-ACK information.

In some embodiments, the preset value is 0; or, the preset value is N powers of 2, where N is a number of bits corresponding to the assignment index information.

In some embodiments, when the second determination unit determines to transmit the HARQ-ACK information, the HARQ-ACK information does not correspond to the first physical channel, and/or, the HARQ-ACK information corresponds to the second physical channel.

In some embodiments, when the second determination unit determines to transmit the HARQ-ACK information, the second determination unit determines a size of the HARQ-ACK information according to a value indicated by the assignment index information.

In some embodiments, the second determination unit determines the value indicated by the assignment index information, including at least one of the following cases: when the assignment index information corresponding to the first physical channel received by the apparatus indicates a preset value and the apparatus does not receive the second physical channel before the first physical channel, determining that the assignment index information indicates 0; when the assignment index information corresponding to the first physical channel received by the apparatus indicates M, and the apparatus receives S second physical channels before the first physical channel, determining that the assignment index information indicates $k*2^N+M$; when the assignment index information corresponding to a last second physical channel received by the apparatus indicates M, and the apparatus receives S second physical channels, determining that the assignment index information indicates $k*2^N+M$; when the assignment index information corresponding to a last physical channel received by the apparatus indicates M and the apparatus receives S second physical channels, determining that the assignment index information indicates $k*2^N+M$, where the last physical channel is the first physical channel or the second physical channel; M is an integer, S is a positive integer, k is the largest integer that satisfies $k*2^N \leq S$, $2^N$ is N powers of 2, and N is the number of bits corresponding to the assignment index information.

In some embodiments, the second determination unit 920 is specifically configured to: determine whether to transmit the HARQ-ACK information according to the reception of at least one the first physical channel and/or at least one the second physical channel in a first control channel monitoring occasion group.

In some embodiments, the first control channel monitoring occasion group includes a concatenation of control channel monitoring occasions on an activated bandwidth part (BWP) of a service cell with which the apparatus is configured.

In some embodiments, the first physical channel includes: a physical channel transmission associated with a HARQ process corresponding to a first state.

In some embodiments, the HARQ process corresponding to the first state includes at least one of the following cases: the HARQ process corresponds to a disabled state; the HARQ process is configured with a disabling parameter; and the HARQ process does not correspond to HARQ-ACK feedback.

In some embodiments, the second physical channel includes at least one of: a physical channel transmission associated with a HARQ process corresponding to a second state; a control channel indicating a semi-persistent scheduling (SPS) physical channel release; a control channel indicating a secondary cell dormancy (SCell dormancy) state; a control channel associated with HARQ-ACK information.

In some embodiments, the HARQ process corresponding to the second state includes at least one of the following cases: the HARQ process corresponds to an enabled state; the HARQ process is not configured with a disabling parameter; and the HARQ process corresponds to HARQ-ACK feedback.

In some embodiments, the apparatus is configured with dynamic codebook feedback.

Figure 10:
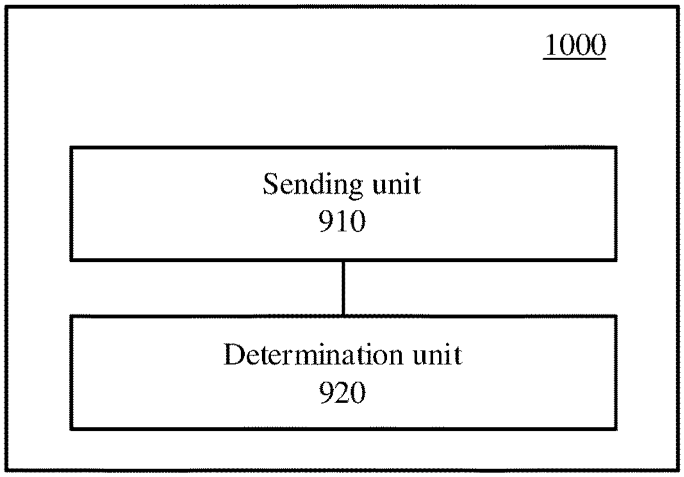
FIG. 10 is a schematic structural view of a communication apparatus according to other embodiments of the present disclosure.

FIG. 10 is a schematic structural view of a communication apparatus according to other embodiments of the present disclosure. The communication apparatus 1000 of FIG. 10 includes a sending unit 1010 and a determination unit 1020.

The sending unit 1010 is configured to send at least one first physical channel and/or at least one second physical channel.

The determination unit 1020 is configured to determine whether to receive a HARQ-ACK information according to a sending of at least one the first physical channel and/or at least one the second physical channel.

In some embodiments, the determination unit 1020 is specifically configured: not to receive the HARQ-ACK information when the apparatus sends only the first physical channel; or, to receive the HARQ-ACK information when the apparatus sends at least one the second physical channel; or, to receive the HARQ-ACK information when the apparatus sends at least one the first physical channel and at least one the second physical channel.

In some embodiments, the determination unit 1020 is specifically configured to: determine an assignment index information and determine whether to receive the HARQ-ACK information, according to the sending of at least one the first physical channel and/or at least one the second physical channel.

In some embodiments, the determination unit 1020 is specifically configured to: determine that the assignment index information indicates a preset value and determine not to receive the HARQ-ACK information, when the apparatus sends only at least one the first physical channel; or, determine that the assignment index information does not indicate a preset value and determine to receive the HARQ-ACK information, when the apparatus sends at least one the second physical channel; or, determine that the assignment index information does not indicate a preset value and determine to receive the HARQ-ACK information, when the apparatus sends at least one the first physical channel and/or at least one the second physical channel.

In some embodiments, the assignment index information corresponds to the first physical channel, and the assignment index information indicates a preset value, including one of the following cases: at least one assignment index information corresponding to at least one the first physical channel sent by the apparatus indicates a preset value; a last assignment index information among at least one assignment index information corresponding to at least one the first physical channel sent by the apparatus indicates a preset value; and each of the at least one assignment index information corresponding to at least one the first physical channel sent by the apparatus indicates a preset value.

In some embodiments, the assignment index information corresponds to the first physical channel, and the assignment index information does not indicate a preset value, including: at least one assignment index information corresponding to at least one the first physical channel sent by the apparatus does not indicate a preset value.

In some embodiments, the assignment index information does not indicate a preset value, including: the assignment index information indicates the number of the second physical channels sent by the apparatus.

In some embodiments, the assignment index information corresponds to the first physical channel, where the assignment index information is a count assignment index information in a control information scheduling a transmission of the first physical channel; and/or, the assignment index information is a total assignment index information in a control information scheduling a transmission of the first physical channel.

In some embodiments, the first physical channel and/or the second physical channel may each be a downlink physical channel, and the assignment index information is DAI information in a control information scheduling a transmission of an uplink physical channel. The uplink physical channel corresponds to the HARQ-ACK information.

In some embodiments, the preset value is 0; or, the preset value is N powers of 2, where N is a number of bits corresponding to the assignment index information.

In some embodiments, when the apparatus determines to receive the HARQ-ACK information, the HARQ-ACK information does not correspond to the first physical channel, and/or, the HARQ-ACK information corresponds to the second physical channel.

In some embodiments, the size of the HARQ-ACK information is determined according to a value indicated by the assignment index information.

In some embodiments, the determination unit 1020 is specifically configured to: determine whether to receive the HARQ-ACK information according to the sending of at least one the first physical channel and/or at least one the second physical channel in a first control channel monitoring occasion group.

In some embodiments, the first control channel monitoring occasion group includes a concatenation of control channel monitoring occasions on an activated bandwidth part (BWP) of a service cell with which the apparatus is configured.

In some embodiments, the first physical channel includes: a physical channel transmission associated with a HARQ process corresponding to a first state.

In some embodiments, the HARQ process corresponding to the first state includes at least one of the following cases: the HARQ process corresponds to a disabled state; the HARQ process is configured with a disabling parameter; and the HARQ process does not correspond to HARQ-ACK feedback.

In some embodiments, the second physical channel includes at least one of: a physical channel transmission associated with a HARQ process corresponding to a second state; a control channel indicating a semi-persistent scheduling (SPS) physical channel release; a control channel indicating a secondary cell dormancy (SCell dormancy) state; a control channel associated with HARQ-ACK information.

In some embodiments, the HARQ process corresponding to the second state includes at least one of the following cases: the HARQ process corresponds to an enabled state; the HARQ process is not configured with a disabling parameter; and the HARQ process corresponds to HARQ-ACK feedback.

Figure 11:
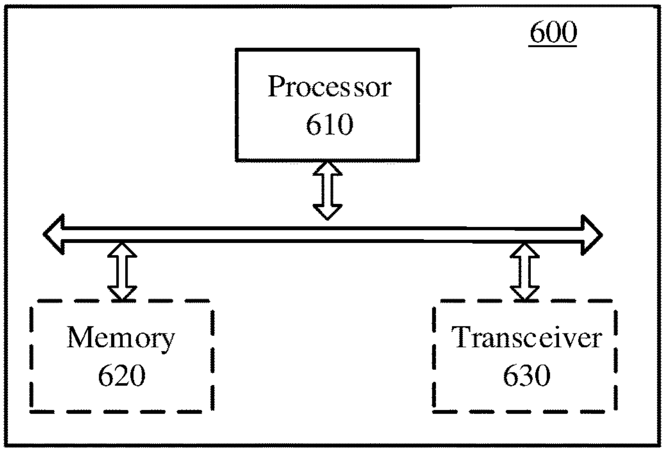
FIG. 11 is a schematic structural view of an apparatus according to some embodiments of the present disclosure.

FIG. 11 is a schematic structural view of an apparatus according to some embodiments of the present disclosure. The broken lines in FIG. 11 indicate that the unit or module is optional. The apparatus 600 may be configured to implement the method described in the method embodiments above. The apparatus 600 may be a chip or a communication apparatus.

The apparatus 600 may include one or more processors 610. The processors 610 may support the apparatus 600 in realizing the methods described in the previous method embodiments. The processor 610 may be a general-purpose processor or a specialized processor. For example, the processor may be a central processing unit (CPU). Alternatively, the processor may be another general-purpose processor, a digital signal processor (DSP), an application specific integrated circuit (ASIC), a field programmable gate array (FPGA), or other programmable logic devices, discrete gate or transistor logic devices, discrete hardware components, and so on. The general-purpose processor may be a microprocessor or any conventional processor, etc.

The apparatus 600 may further include one or more memories 620. The memory 620 has a program stored on it that may be executed by the processor 610, causing the processor 610 to perform the methods described in the preceding method embodiments. The memory 620 may be independent of the processor 610 or may be integrated into the processor 610.

The apparatus 600 may further include a transceiver 630. The processor 610 may communicate with other devices or chips through the transceiver 630. For example, the processor 610 may send and receive data with other devices or chips through the transceiver 630.

The embodiments of the present disclosure further provide a computer-readable storage medium for storing a program. The computer-readable storage medium may be applied in a communication apparatus provided by the embodiments of the present disclosure, and the program causes the computer to perform the method performed by the communication apparatus in various embodiments of the present disclosure.

The embodiments of the present disclosure further provide a computer program product. The computer program product includes a program. The computer program product may be applied in a communication apparatus provided by the embodiments of the present disclosure, and the program causes the computer to perform the method performed by the communication apparatus in various embodiments of the present disclosure.

The embodiments of the present disclosure further provide a computer program. The computer program may be applied in a communication apparatus provided by the embodiments of the present disclosure, and the computer program causes the computer to perform the method performed by the communication apparatus in various embodiments of the present disclosure.

It should be understood that, in the embodiments of the present disclosure, terms "B corresponding to A" indicate that B is associated with A and that B can be determined according to A. It should also be understood that determining B according to A does not mean that B can be determined according to A alone, but that B can be determined according to A and/or other information.

It should be understood that terms "and/or" are merely a description of an associated relationship of associated objects, indicating that three types of relationships may exist, e.g., A and/or B, which may be represented as: A alone, both A and B, and B alone. In addition, the character "/" herein generally indicates that the associated objects are in an "or" relationship.

It should be understood that in various embodiments of the present disclosure, the serial number of each of the above processes does not imply the order of execution, and the order of execution of each of the processes should be determined by its function and inherent logic without constituting any limitation to the implementation process of the embodiments of the present disclosure.

In the several embodiments provided in the present disclosure, it should be understood that the systems, apparatuses, and methods disclosed, may be realized in other ways. For example, the above-described embodiments of the apparatus are merely schematic, e.g., the division of the units, as described, is merely a logical functional division, and the actual implementation may be divided in other ways, e.g., multiple units or components may be combined or may be integrated into another system, or some features may be ignored, implemented. At another point, the coupling or direct coupling or communication connection between each other shown or discussed may be an indirect coupling or communication connection through some interface, device, or unit, which may be electrical, mechanical, or otherwise.

The units illustrated as separated components may or may not be physically separated, and the components shown as units may or may not be physical units, i.e., they may be located in one place or they may also be distributed over multiple network units. Some or all of these units may be selected to fulfill the purpose of the embodiments according to actual needs.

In addition, the functional units in various embodiments of the present disclosure may be integrated in a single processing unit, or each unit may be physically present separately, or two or more units may be integrated in a single unit.

The above-described embodiments may be realized in whole or in part by software, hardware, firmware, or any combination thereof. When implemented using software, it may be implemented wholly or partially in the form of a computer program product. The computer program product includes one or more computer instructions. Loading and executing the computer program instructions on a computer produces, in whole or in part, a process or function in accordance with the embodiments of the present disclosure. The computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted from a web site, computer, server, or data center through wired (e.g., coaxial cable, fiber optics, digital subscriber line (DSL)) or wireless (e.g., infrared, wireless, microwave, etc.) to another website site, computer, server, or data center. The computer-readable storage medium may be any usable medium that can be read by a computer or a data storage device such as a server, data center, etc. that contains one or more usable media integrated. The usable medium may be a magnetic medium, (e.g., a floppy disk, a hard disk, a tape), an optical medium (e.g., a digital video disc (DVD)), or a semiconductor medium (e.g., a solid-state disk (SSD)), and the like.

The foregoing is only some specific embodiments of the present disclosure, but the scope of the present disclosure is not limited thereto, and those skilled in the art can easily think of changes or substitutions within the scope of the technology disclosed in the present disclosure, which shall be covered by the scope of the present disclosure. Therefore, the scope of the present disclosure shall be stated to be subject to the scope of the claims.

What is claimed is:

1. A method for HARQ-ACK information transmission, comprising:

determining, by a terminal device, a reception of at least one first physical channel and/or at least one second physical channel; and determining, by the terminal device, whether to transmit a hybrid automatic repeat-request acknowledgement (HARQ-ACK) information according to the reception of the at least one first physical channel and/or the at least one second physical channel;

wherein the determining, by the terminal device, whether to transmit the HARQ-ACK information according to the reception of the at least one first physical channel and/or the at least one second physical channel comprises:

determining, by the terminal device, whether to transmit the HARQ-ACK information according to the reception of the at least one first physical channel and/or the at least one second physical channel, and an assignment index information;

wherein the determining, by the terminal device, whether to transmit the HARQ-ACK information according to the reception of the at least one first physical channel and/or the at least one second physical channel, and the assignment index information comprises:

not transmitting, by the terminal device, the HARQ-ACK information in response to the terminal device receiving only a first physical channel and the assignment index information indicating a preset value; or not transmitting, by the terminal device, the HARQ-ACK information in response to the terminal device not receiving a second physical channel and the assignment index information indicating the preset value; or not transmitting, by the terminal device, the HARQ-ACK information in response to the terminal device receiving the at least one first physical channel and not receiving the second physical channel and the assignment index information indicating the preset value; or not transmitting, by the terminal device, the HARQ-ACK information in response to the terminal device not receiving the first physical channel and not receiving the second physical channel and the assignment index information indicating the preset value;

wherein the preset value is N powers of 2, where N is a number of bits corresponding to the assignment index information.

2. The method according to claim 1, wherein the determining, by the terminal device, whether to transmit the HARQ-ACK information according to the reception of the at least one first physical channel and/or the at least one second physical channel, and the assignment index information further comprises:

transmitting, by the terminal device, the HARQ-ACK information in response to the terminal device receiving the at least one first physical channel and/or the at least one second physical channel and the assignment index information not indicating the preset value; or transmitting, by the terminal device, the HARQ-ACK information in response to the terminal device receiving only the first physical channel and the assignment index information not indicating the preset value; or transmitting, by the terminal device, the HARQ-ACK information in response to the terminal device receiving the at least one first physical channel and not receiving the second physical channel and the assignment index information not indicating the preset value.

3. The method according to claim 1, wherein each of the first physical channel and/or the second physical channel is a downlink physical channel, and the assignment index information is a downlink assignment index (DAI) information in a control information scheduling a transmission of an uplink physical channel; the uplink physical channel corresponds to the HARQ-ACK information.

4. The method according to claim 1, further comprising:

determining, by the terminal device, a size of the HARQ-ACK information according to a value indicated by the assignment index information, in response to the terminal device determining to transmit the HARQ-ACK information.

5. The method according to claim 4, further comprising:

determining, by the terminal device, the value indicated by the assignment index information, comprising at least one of:

determining, by the terminal device, that the assignment index information indicates 0, in response to the assignment index information corresponding to the first physical channel received by the terminal device indicating the preset value and the terminal device not receiving the second physical channel before the first physical channel;

determining, by the terminal device, that the assignment index information indicates $k*2^N+M$, in response to the assignment index information corresponding to the first physical channel received by the terminal device indicating M and a number of the at least one second physical channel received by the terminal device before the first physical channel being S;

determining, by the terminal device, that the assignment index information indicates $k*2^N+M$, in response to the assignment index information corresponding to a last second physical channel among the at least one second physical channel received by the terminal device indicating M and a number of the at least one second physical channel received by the terminal device being S; or determining, by the terminal device, that the assignment index information indicates $k*2^N+M$, in response to the assignment index information corresponding to a last physical channel received by the terminal device indicating M and a number of the at least one second physical channel received by the terminal device being S; wherein the last physical channel is the first physical channel or the second physical channel;

wherein M is an integer, S is a positive integer, k is a largest integer that satisfies $k*2^N \leq S$, $2^N$ is N powers of 2, and N is a number of bits corresponding to the assignment index information.

6. The method according to claim 1, wherein the first physical channel comprises:

a physical channel associated with a HARQ process corresponding to a first state.

7. The method according to claim 6, wherein the HARQ process corresponds to the first state, comprising at least one of:

the HARQ process corresponds to a disabled state;

the HARQ process is configured with a disabling parameter; or the HARQ process does not correspond to HARQ-ACK feedback.

8. The method according to claim 1, wherein the second physical channel comprises at least one of:

a physical channel associated with a HARQ process corresponding to a second state;

a control channel indicating a semi-persistent scheduling (SPS) physical channel release;

a control channel indicating a secondary cell dormancy (SCell dormancy) state; or a control channel associated with the HARQ-ACK information.

9. The method according to claim 8, wherein the HARQ process corresponds to the second state, comprising at least one of:

the HARQ process corresponds to an enabled state;

the HARQ process is not configured with a disabling parameter; or the HARQ process corresponds to HARQ-ACK feedback.

10. A method for HARQ-ACK information transmission, comprising:

sending, by a network device, at least one first physical channel and/or at least one second physical channel; and determining, by the network device, whether to receive a hybrid automatic repeat-request acknowledgement (HARQ-ACK) information according to a sending of the at least one first physical channel and/or the at least one second physical channel;

wherein the determining, by the network device, whether to receive the HARQ-ACK information according to the sending of the at least one first physical channel and/or the at least one second physical channel comprises:

determining, by the network device, an assignment index information and whether to receive the HARQ-ACK information, according to the sending of the at least one first physical channel and/or the at least one second physical channel;

wherein the determining, by the network device, the assignment index information and whether to receive the HARQ-ACK information, according to the sending of the at least one first physical channel and/or the at least one second physical channel comprises:

determining, by the network device, that the assignment index information indicates a preset value and not to receive the HARQ-ACK information, in response to the network device sending only the at least one first physical channel;

wherein the preset value is N powers of 2, where N is a number of bits corresponding to the assignment index information.

11. The method according to claim 10, wherein the determining, by the network device, the assignment index information and whether to receive the HARQ-ACK information, according to the sending of the at least one first physical channel and/or the at least one second physical channel further comprises:

determining, by the network device, that the assignment index information does not indicate the preset value and to receive the HARQ-ACK information, in response to the network device sending the at least one second physical channel; or determining, by the network device, that the assignment index information does not indicate the preset value and to receive the HARQ-ACK information, in response to the network device sending the at least one first physical channel and/or the at least one second physical channel.

12. The method according to claim 10, wherein each of a first physical channel and/or a second physical channel is a downlink physical channel, and the assignment index information is a downlink assignment index (DAI) information in a control information scheduling a transmission of an uplink physical channel; the uplink physical channel corresponds to the HARQ-ACK information.

13. A non-transitory computer-readable storage medium, storing a program; wherein the program is configured to be executed by a computer to perform:

determining, by a terminal device, a reception of at least one first physical channel and/or at least one second physical channel; and determining, by the terminal device, whether to transmit a hybrid automatic repeat-request acknowledgement (HARQ-ACK) information according to the reception of the at least one first physical channel and/or the at least one second physical channel;

wherein the determining, by the terminal device, whether to transmit the HARQ-ACK information according to the reception of the at least one first physical channel and/or the at least one second physical channel comprises:

determining, by the terminal device, whether to transmit the HARQ-ACK information according to the reception of the at least one first physical channel and/or the at least one second physical channel, and an assignment index information;

wherein the determining, by the terminal device, whether to transmit the HARQ-ACK information according to the reception of the at least one first physical channel and/or the at least one second physical channel, and the assignment index information comprises:

not transmitting, by the terminal device, the HARQ-ACK information in response to the terminal device receiving only a first physical channel and the assignment index information indicating a preset value; or not transmitting, by the terminal device, the HARQ-ACK information in response to the terminal device not receiving a second physical channel and the assignment index information indicating the preset value; or not transmitting, by the terminal device, the HARQ-ACK information in response to the terminal device receiving the at least one first physical channel and not receiving the second physical channel and the assignment index information indicating the preset value; or not transmitting, by the terminal device, the HARQ-ACK information in response to the terminal device not receiving the first physical channel and not receiving the second physical channel and the assignment index information indicating the preset value;

wherein the preset value is N powers of 2, where N is a number of bits corresponding to the assignment index information.

* * * * *